(12) United States Patent
Zver et al.

(10) Patent No.: US 10,329,755 B2
(45) Date of Patent: Jun. 25, 2019

(54) SINK ATTACHMENT FOR ARRANGING ON A SINK

(71) Applicant: BLANCO GmbH + Co KG, Oberderdingen (DE)

(72) Inventors: Alexandra Zver, Kampfelbach (DE); Josef Keller, Karlsruhe (DE)

(73) Assignee: BLANCO GmbH+ Co KG, Obederdingen (DE)

( * ) Notice: Subject to any disclaimer, the term of this patent is extended or adjusted under 35 U.S.C. 154(b) by 0 days.

(21) Appl. No.: 15/850,913

(22) Filed: Dec. 21, 2017

(65) Prior Publication Data

US 2018/0179744 A1 Jun. 28, 2018

(30) Foreign Application Priority Data

Dec. 22, 2016 (DE) .................. 10 2016 125 501

(51) Int. Cl.
| | |
|---|---|
| *E03C 1/33* | (2006.01) |
| *E03C 1/186* | (2019.01) |
| *A47J 47/20* | (2019.01) |
| *E03C 1/22* | (2006.01) |

(52) U.S. Cl.
CPC .................. *E03C 1/33* (2013.01); *A47J 47/20* (2013.01); *E03C 1/186* (2013.01); *E03C 1/22* (2013.01)

(58) Field of Classification Search
CPC ............. A47J 47/20; E03C 1/186; E03C 1/33
See application file for complete search history.

(56) References Cited

U.S. PATENT DOCUMENTS

| | | |
|---|---|---|
| 1,986,935 A | 1/1935 | Levine |
| 2,005,459 A | 6/1935 | Finn |
| 2,045,965 A | 6/1936 | Rosen |
| (Continued) | | |

FOREIGN PATENT DOCUMENTS

| | | |
|---|---|---|
| DE | 103 25 492 | 9/2004 |
| GB | 656 219 | 8/1951 |

OTHER PUBLICATIONS

European Patent Office, "Extended European Search Report," issued in connection with European Patent Application No. 17207020.3, with English translation, dated May 2, 2018, 18 pages.

(Continued)

*Primary Examiner* — Janie M Loeppke
(74) *Attorney, Agent, or Firm* — Hanley, Flight & Zimmerman, LLC.

(57) ABSTRACT

In order to create a sink attachment for arranging on a sink, comprising a coupling device for coupling the sink attachment to a coupling sidewall of a basin of the sink in a working position, which can be easily and stably positioned without multiple horizontal supporting faces having to be formed at the same height on the sink or on a work surface on which the sink is arranged, and without the functionality of the sink attachment or of the sink being limited, it is proposed that the coupling device comprises an inner coupling element that is configured to be seated, in the working position, onto the inner side of the coupling side wall facing the interior of the basin, and comprises an outer coupling element that is configured to be seated, in the working position, onto an outer side of the coupling side wall facing away from the interior of the basin.

15 Claims, 24 Drawing Sheets

(56) References Cited

U.S. PATENT DOCUMENTS

| | | | |
|---|---|---|---|
| 3,625,162 A | 12/1971 | Crew | |
| D354,123 S * | 1/1995 | Cope | D23/308 |
| 2009/0139023 A1 | 6/2009 | Talerico | |
| 2011/0056016 A1 | 3/2011 | Mun | |

OTHER PUBLICATIONS

German Patent Office, "Search Report," issued in connection with German Patent Application No. 10 2016 125 501.7, with English translation, dated Jul. 14, 2017, 16 pages.

* cited by examiner

SINK ATTACHMENT FOR ARRANGING ON A SINK

RELATED APPLICATION

The present disclosure relates to the subject matter disclosed in German application number 10 2016 125 501.7 of Dec. 22, 2016, which is incorporated herein by reference in its entirety and for all purposes.

BACKGROUND OF THE INVENTION

The present invention relates to a sink attachment for arranging on a sink, comprising a coupling device for coupling the sink attachment to a coupling sidewall of a basin of the sink in a working position of the sink attachment.

Sink attachments are available for the basins of sinks, such as, for example, a cutting board, a drip grate, or a bowl that can be hung from above into the basin or can be placed on opposing segments of a basin rim.

Here, the sink attachment is, for example, placed onto a tap ledge of the sink on the one side, and onto a horizontal rim region of the basin on the other side. For this, it is necessary, however, that the front and rear supporting faces for the sink attachment, in particular the tap ledge and the basin rim region, have a uniform height level.

Furthermore, it is known to place a sink attachment on horizontal supporting faces which are provided on tiers arranged in the sidewalls of the basin. For this, a complex design of the respective sidewalls of the basin is necessary.

A sink attachment can also be placed on a sink rim running around the basin. Also for this, it is necessary that the sink rim lies at the same height level everywhere.

Furthermore, it is known to set up a sink attachment on a bottom region of the basin of the sink. This results in little stability in the arrangement of the sink attachment on the basin and in limited functionality of the sink attachment and of the basin of the sink.

In the known connections described above of a sink attachment to a basin of a sink (apart from setting up the sink attachment on a bottom region of the basin of the sink), it is necessary that the sink has a uniform height level in all supporting regions on which the respective sink attachment is placed.

There are sinks, however, in the form of troughs, in which the tap ledge and other segments of the sink rim lie at different height levels. Here, a connection of a sink attachment is difficult due to the height level mismatch.

It may be further provided that the sink is arranged on a work surface which covers parts of the sink rim, such that a height difference exists between the top side of the work surface on the one side, and the top side of the sink rim on the other side. Here, the height difference of the top side of the work surface relative to the uncovered segment of the sink rim depends on the material thickness of the respectively used work surface, which makes the connection of a sink attachment to a sink difficult.

The object underlying the present invention is to create a sink attachment for arranging on a sink, which can be easily and stably positioned on a sink, without multiple horizontal supporting faces at the same height level having to be formed on the sink or on a work surface on which the sink is arranged, and without the functionality of the sink attachment or of the sink being limited.

SUMMARY OF THE INVENTION

The object is achieved, according to the invention, in a sink attachment for arranging on a sink, said sink attachment comprising a coupling device for coupling the sink attachment to a coupling sidewall of a basin of the sink in a working position, in that the coupling device of the sink attachment comprises an inner coupling element that is configured to be seated, in the working position, onto an inner side of the coupling sidewall facing the interior of the basin, and comprises an outer coupling element that is configured to be seated, in the working position, onto an outer side of the coupling sidewall facing away from the interior of the basin.

The concept underlying the present invention is to couple the sink attachment in at least one working position of the sink attachment not onto two opposing sides of the basin, nor onto the sink, nor onto a work surface on which the sink is arranged, but rather to couple the sink attachment by means of the inner coupling element and the outer coupling element onto only a single coupling sidewall of the basin of the sink, such that no compensation is necessary for the height level mismatch of opposing sidewalls of the basin of the sink or of regions of the work surface on which the sink is arranged.

This offers the advantage that an upper rim of the coupling sidewall, on the one side, and an upper rim of another sidewall of the basin opposite to the coupling sidewall, or an upper side of a work surface, which covers a sidewall opposite to the coupling sidewall, can lie at different height levels, without thereby impeding the coupling of the sink attachment to the basin of the sink.

The working height of the sink attachment above the bottom region of the basin, in which the sink attachment in the working position is coupled to the basin of the sink, can be determined by the design of the coupling sidewall alone, without considering the design of the sidewall of the basin opposite to the coupling sidewall or of a work surface on which the sink is arranged.

The coupling sidewall is preferably a front sidewall of the basin of the sink that faces the user of the sink upon use of the sink.

The inner side and the outer side of the coupling sidewall are preferably connected to each other by a basin rim of the basin.

The coupling sidewall can be formed solidly or can have a cavity arranged between the inner side and the outer side.

In a preferred configuration of the invention, it is provided that the inner coupling element is configured to be seated, in the working position, substantially in area contact with the inner side of the coupling sidewall and/or that the outer coupling element is configured to be seated, in the working position, substantially in area contact with the outer side of the coupling sidewall.

The inner coupling element and/or the outer coupling element may, in particular, be formed as a bar extending in a longitudinal direction of the sink attachment.

Alternatively or additionally hereto, it may also be provided that the inner coupling element in the working position is configured to be seated onto the inner side of the coupling sidewall at one or more, for example four, contact structures which are each formed as a line or as a point, and/or that the outer coupling element in the working position is configured to be seated onto the outer side of the coupling sidewall at one or more, for example four, contact structures which each are formed as a line or as a point.

The inner coupling element and/or the outer coupling element may, for example, comprise one or more pins or pegs which are configured to be seated onto the respectively assigned side of the coupling sidewall.

It is preferably possible to shift the sink attachment in its working position relative to the basin of the sink along its longitudinal direction, which preferably corresponds to a longitudinal direction of the sink.

The inner coupling element and the outer coupling element can be arranged on a base body of the sink attachment having a supporting face.

Said supporting face is preferably oriented substantially horizontally in the working position of the sink attachment.

The inner coupling element and/or the outer coupling element may be integrally formed with the base body or produced separate from the base body and fixed to the base body.

The inner coupling element may have an inner seating face and the outer coupling element may have an outer seating face, wherein the inner seating face and the outer seating face are preferably tilted toward each other in such a way that the distance between the inner seating face and the outer seating face decreases with decreasing distance from the base body.

Thus, a receiving space bound by the inner seating face and the outer seating face for an upper rim region of the coupling sidewall tapers toward the base body.

The inner seating face and/or the outer seating face are preferably tilted with respect to a normal direction of the supporting face of the base body which is preferably oriented parallel to the vertical in the working position of the sink attachment.

Here, the tilt of the inner seating face and/or of the outer seating face with respect to the normal direction of the supporting face is preferably at least about 1°, in particular at least about 3°, particularly preferably at least about 6°.

Furthermore, it is preferably provided that the tilt of the inner seating face and/or of the outer seating face is maximally about 20°, in particular maximally about 10°, particularly preferably maximally about 8°.

In a preferred configuration of the sink attachment according to the invention, it is provided that the sink attachment comprises a second inner coupling element that is configured to be seated, in a second working position in which the sink attachment is rotated about an angle of 180° with respect to the first working position, onto the inner side of the coupling sidewall, and comprises a second outer coupling element that is configured to be seated, in the second working position, onto the outer side of the coupling sidewall.

In doing so, the sink attachment is formed reversibly, that is, it can be arranged on the basin of the sink in two different working positions, wherein the sink attachment in the second working position is rotated about an angle of 180° with respect to the first working position.

It is especially advantageous if the sink attachment is formed substantially symmetrical with respect to a rotation of 180° about an axis of rotation running perpendicular to the supporting face of the sink attachment through the center of gravity thereof, and/or if the sink attachment is formed substantially mirror symmetrical with respect to a longitudinal median plane of the sink attachment running parallel to the longitudinal direction of the sink attachment and perpendicular to the supporting face of the sink attachment.

Alternatively or additionally hereto, it may be provided that the sink attachment is configured to be seated onto the basin of the sink in a transverse position, in which the longitudinal direction of the sink attachment is rotated about an angle of 90° with respect to the working position.

To this end, it may be provided, in particular, that the sink attachment comprises a first face-side coupling device for coupling the sink attachment to a coupling sidewall of the basin of the sink and a second face-side coupling device for coupling the sink attachment to a second sidewall of the basin of the sink opposite to the coupling sidewall of the basin.

Thus, in the transverse position, the sink attachment is not placed on substantially horizontal supporting faces on the basin, nor on a region of the sink surrounding the basin, nor on a work surface on which the sink is arranged, but rather is arranged directly on two opposing sidewalls of the basin which are preferably tilted with respect to the vertical in the assembled state of the sink.

Here, it may be provided, in particular, that the first face-side coupling device has at least one first face-side seating face which is configured to be mounted onto the inner side of the coupling sidewall of the basin in the transverse position, and that the second face-side coupling device has at least one second face-side seating face which is configured to be seated onto the inner side of the sidewall of the basin opposite to the coupling sidewall in the transverse position.

In this case, the sink attachment is at least partially inserted into the basin and jams between the coupling sidewall and the other sidewall of the basin opposite to the coupling sidewall at a working height specified by the dimensions of the sink attachment in its longitudinal direction.

Here, the first face-side coupling device and/or the second face-side coupling device are preferably configured to be coupled to the respectively assigned sidewall of the basin by positive connection and/or by force-locking connection, in particular by frictional connection.

The first face-side seating face and/or the second face-side seating face are preferable tilted with respect to a normal direction of a supporting face of a base body of the sink attachment, which is preferably oriented in parallel to the vertical in the transverse position of the sink attachment.

Here, the tilt of the respective face-side seating face with respect to the normal direction of the supporting face of the base body of the sink attachment is preferably at least about 1°, in particular at least about 3°, particularly preferably at least about 6°.

Furthermore, it is preferably provided that the tilt of the respective face-side seating face with respect to the normal direction of the supporting face of the base body of the sink attachment is maximally about 20°, in particular maximally about 10°, particularly preferably maximally about 8°.

The sink attachment may, in principle, have any function and design.

In preferred configurations of the invention, it is provided that the sink attachment is configured, for example, as a cutting board, as a bowl, as a draining element, and/or as a grate.

The sink attachment according to the invention is suited, in particular, to be used to provide a supporting face on a basin of a sink, said supporting face preferably having a substantially horizontally oriented supporting face in a working position of the sink attachment, wherein the sink attachment is coupled by means of the coupling device to a coupling sidewall of the basin.

Any objects, for example tableware pieces and/or flatware pieces, can be placed on the supporting face provided by the sink attachment.

The sink attachment according to the invention preferably constitutes a component of a combination of a sink comprising at least one basin and one such sink attachment, wherein the sink attachment is coupled by means of the coupling device to a coupling sidewall of the basin of the sink.

Furthermore, such a combination may comprise a work surface, on which the sink is arranged.

Here, it is preferably provided that the work surface at least partially, particularly preferably fully, covers the upper rim regions of one, two, or three sidewalls of the basin.

The sink is preferably configured as a kitchen sink.

It is particularly advantageous if the sink attachment comprises a base body, on which the inner coupling element and the outer coupling element of the coupling device are arranged, wherein an underside of the base body connects an upper edge of the inner coupling element facing the base body to an upper edge of the outer coupling element facing the base body, and wherein the underside of the base body in the working position of the sink attachment is spaced apart from the coupling sidewall of the basin, in particular from a basin rim on the upper side of the coupling sidewall.

In doing so, it is possible to accommodate for resulting manufacturing tolerances in the production of the basin of the sink and/or in the production of the sink attachment, such that the sink attachment can always be easily coupled to the coupling sidewall of the basin.

The region of the coupling sidewall, to which the sink attachment in the working position is coupled, can be formed substantially smooth and/or substantially flat, and/or without tiers.

It may also be provided, however, that the region of the coupling sidewall, to which the sink attachment in the working position is coupled, has a tier, wherein a tier complementary hereto is preferably provided on the associated coupling element.

Furthermore, it may be provided that the region of the coupling sidewall, to which the sink attachment in the working position is coupled, has a rough surface, through which a clamping effect between the sink attachment and the coupling sidewall is preferably increased.

It is particularly advantageous if the sink attachment in the working position is not in contact with a bottom region of the basin of the sink.

By coupling the sink attachment in the working position by means of the coupling device to the coupling sidewall of the basin, and preferably only to the coupling sidewall of the basin and to no other sidewall, a secure, stable functioning of the sink attachment on or in the basin is ensured.

The sink attachment can, apart from being used in the transverse position or in the working position coupled to the basin, additionally also be used on a work surface, for example as a trivet, or on the bottom region of the basin, for example as a grate.

The sink attachment can be coupled to the basin in various positions relative to the basin.

In particular, it is possible to position the sink attachment substantially centered on the coupling sidewall of the basin.

The sink attachment can also be coupled to the basin offset with respect to a centered position on the coupling sidewall, for example offset to the left or to the right.

The sink attachment is preferably coupled substantially in area contact with a front coupling sidewall of the basin of the sink.

It is preferably coupled to the coupling sidewall in that it encloses in an exactly fitting manner an upper rim region of the coupling sidewall on the inner side facing the interior of the basin and on the outer side facing away from the interior of the basin with two contact elements, preferably in the form of two longitudinal bars.

The design and the function of the sink attachment according to the invention enable safe usage of the sink attachment, for example in the form of a cutting board, above the basin.

Even if a free basin rim not covered by a work surface is only available on the front sidewall of the basin facing the user, the sink attachment can nevertheless be securely positioned, preferably with its longitudinal direction parallel to the longitudinal extension of the front sidewall of the basin.

In particular by means of the aforementioned face-side coupling devices, the sink attachment can also be coupled in a transverse position to the basin, in particular to the coupling sidewall and to another sidewall of the basin opposite to the coupling sidewall.

Furthermore, the cutting board can also be set up on the work surface or on a table surface, in particular by means of supporting elements made, for example, of an elastomer material.

The tilt of the outer seating face of the outer coupling element and of the inner seating face of the inner coupling element with respect to the normal direction of the supporting face of the sink attachment preferably corresponds substantially to the tilt of the inner side of the coupling sidewall and to the tilt of the outer side of the coupling sidewall in its upper rim region, respectively, with respect to the vertical in the assembled state of the sink.

The smallest distance between the inner coupling element and the outer coupling element in the transverse direction of the sink attachment is preferably smaller than the smallest horizontal extension of the basin rim in the region of the coupling sidewall on the upper side of the coupling sidewall in the assembled state of the sink.

This can thus result in a compensation for the production tolerances of the sink and the sink attachment.

The inner coupling element and the outer coupling element and their connection to the base body of the sink attachment have sufficient stability in order to keep the supporting face of the sink attachment in the working position stable, even under load of the sink attachment in the use thereof.

If the sink attachment in the working position is arranged on the basin, the inner coupling element and the outer coupling element have a sufficiently large vertical extension, in order to prevent the sink attachment from tipping over relative to the coupling sidewall of the basin.

The sink attachment is securely positioned over the interior of the basin by being mounted on the upper rim region of the coupling sidewall of the basin, in particular on the front sidewall of the basin.

This enables the use of the sink attachment, in particular on a sink in the form of a trough, in which the basin rim on the front sidewall on the one side and on the rear sidewall opposite to the front sidewall on the other side have different height levels.

Upon coupling to the front sidewall of the basin, the sink attachment in the working position is advantageously in the proximity of the user, to whom the front sidewall of the basin faces.

Upon configuring the sink attachment as a cutting board, the cutting board may constitute a bridging cutting board when being set up on the work surface.

The format of the sink attachment, in particular in the form of a cutting board, is easy to handle and ergonomic.

The geometry, in particular the dimensions, of the sink attachment can be easily adapted to other dimension of the basin of the sink.

If the sink attachment provides at least one face-side coupling device with face-side seating faces tilted with respect to the normal direction of the supporting face of the sink attachment, the sink attachment can be placed on these face-side seating surfaces for drying and can therefore, in particular, be leaned slanted against a back wall arranged behind the sink.

Further features and advantages of the invention are subject matter of the subsequent description and of the graphic depiction of an embodiment example.

BRIEF DESCRIPTION OF THE DRAWINGS

In the drawings.

Equal or functionally equivalent elements are designated with the same reference numerals in all figures.

DETAILED DESCRIPTION OF THE INVENTION

Figure 1:
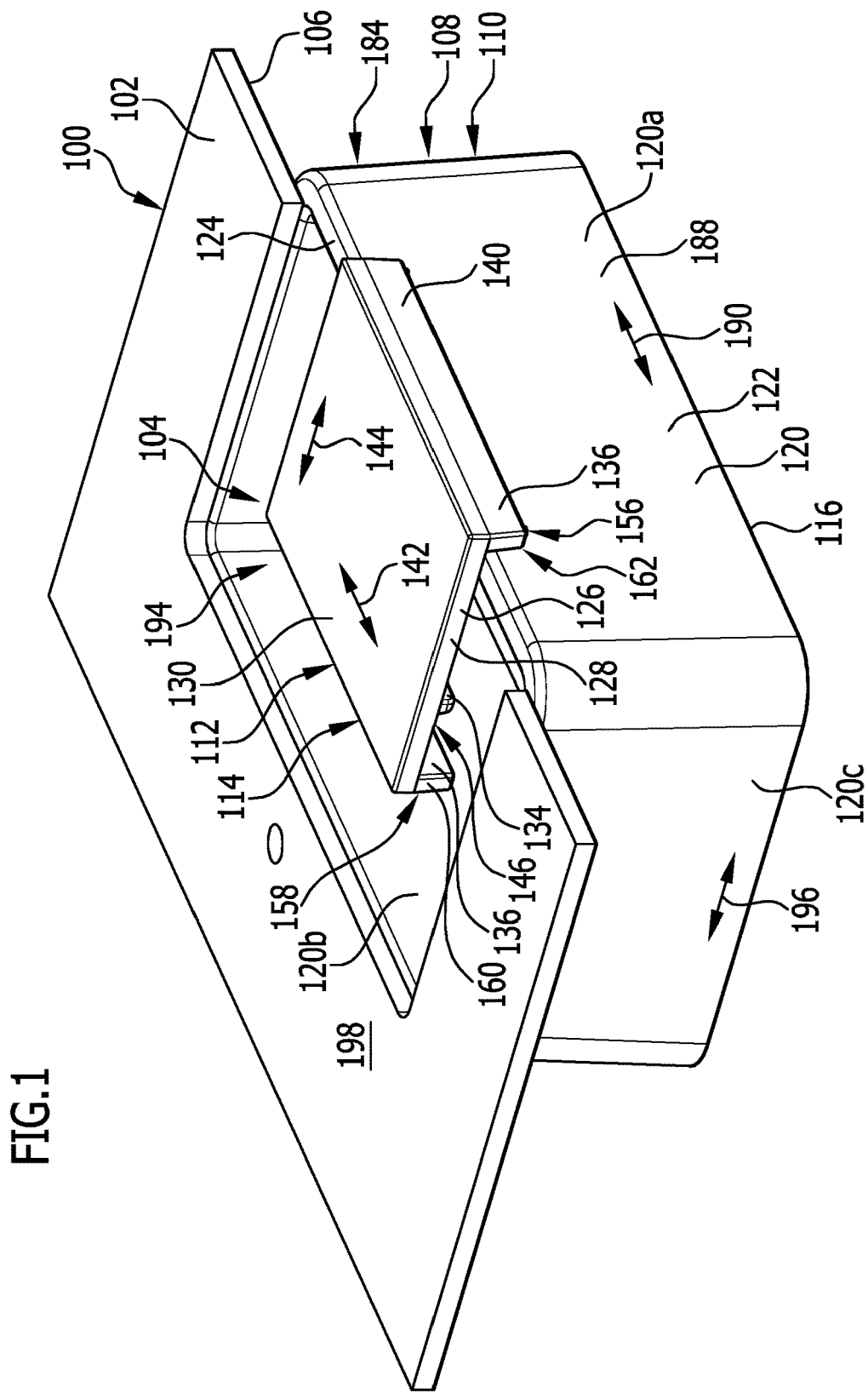
FIG. 1 shows a perspective depiction of a basin of a sink, in particular of a kitchen sink, whose upper rim is covered by a work surface on three sides, and of a sink attachment arranged on the basin in the form of a cutting board that, in a working position, in which a longitudinal direction of the sink attachment corresponds to a longitudinal direction of the sink, is coupled by a coupling device to a front coupling sidewall of the basin.
Figure 2:
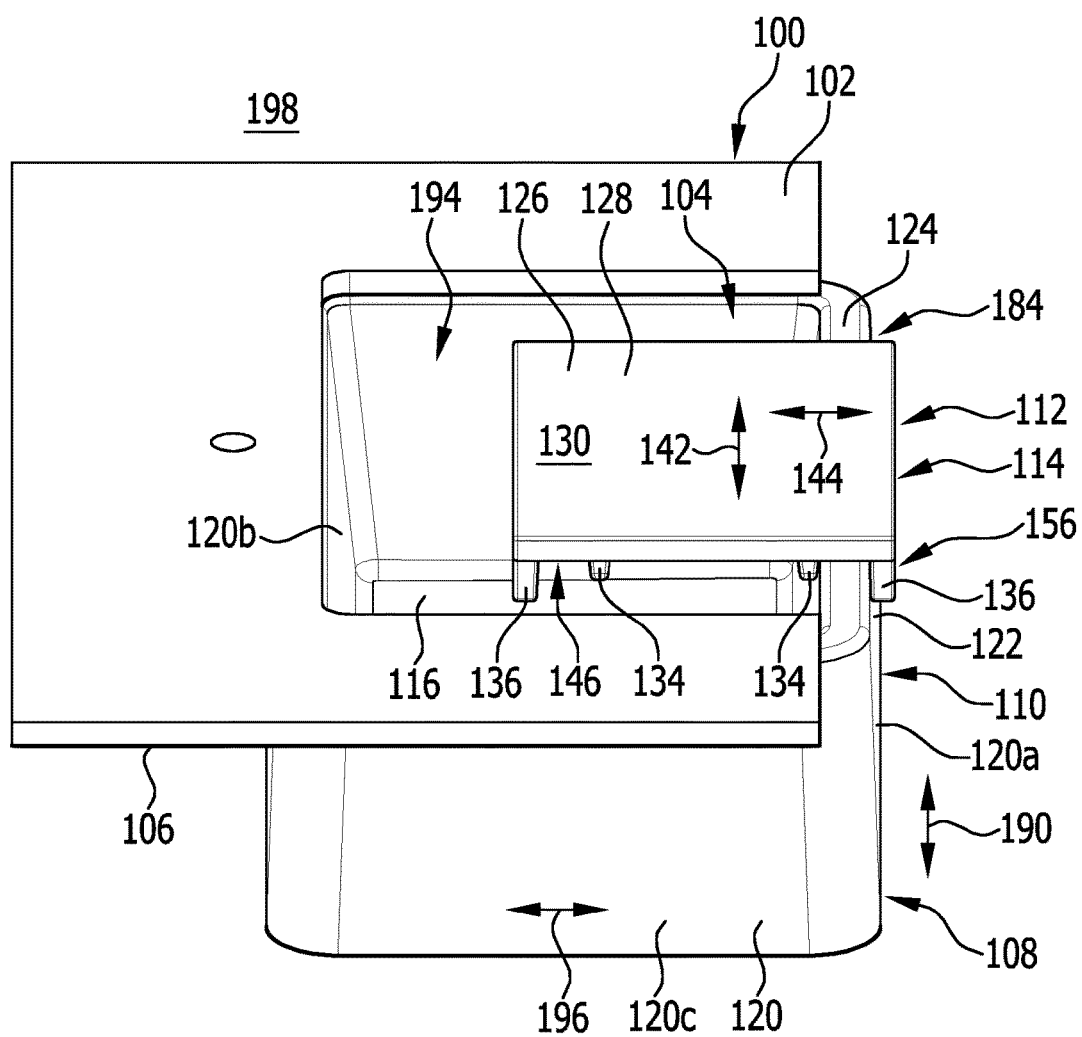
FIG. 2 shows another perspective depiction of the combination comprising sink, work surface, and sink attachment from FIG. 1, with the viewing direction parallel to the long sides of the basin.
Figure 3:
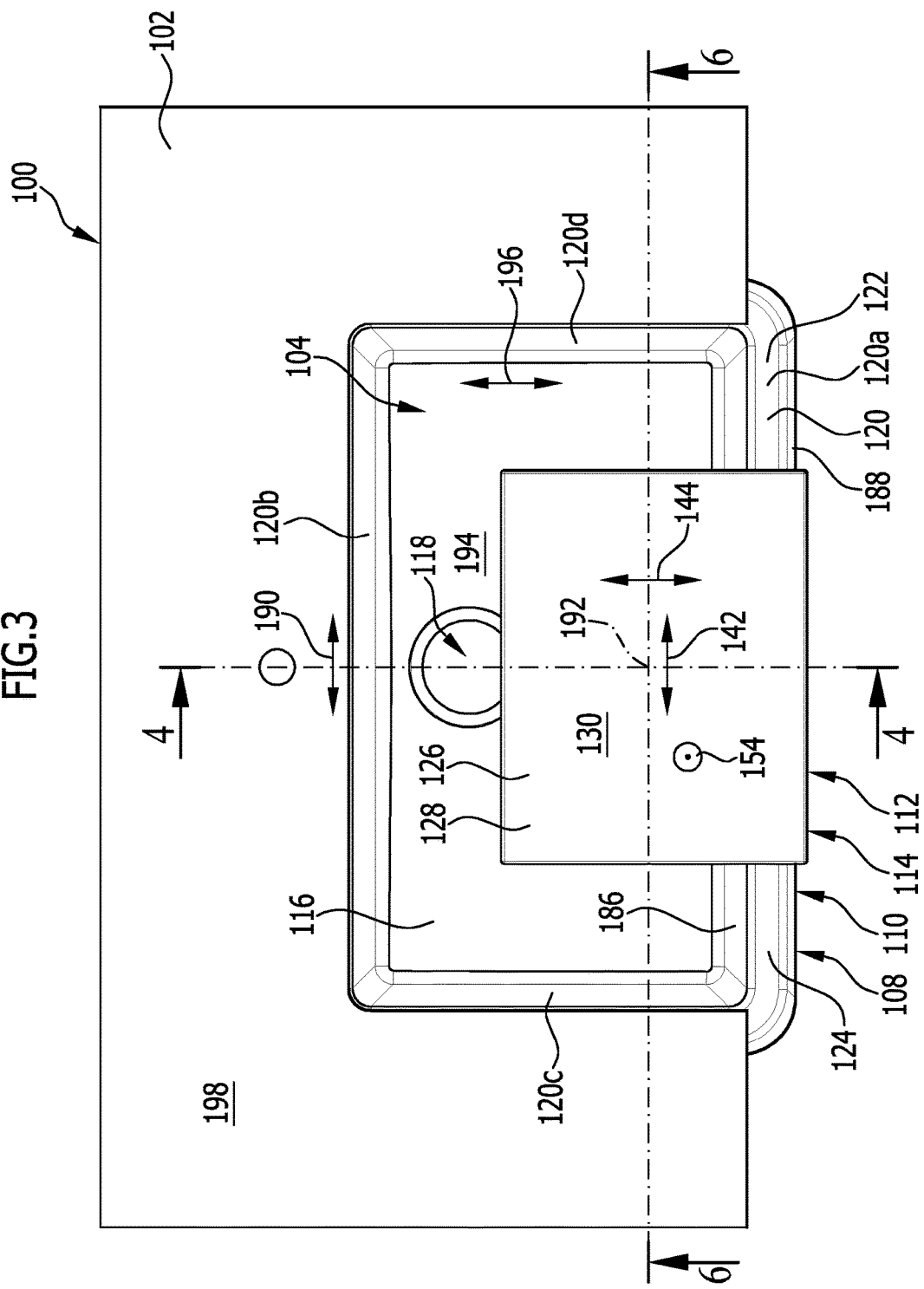
FIG. 3 shows a top view from above onto the combination comprising sink, work surface, and sink attachment from FIGS. 1 and 2.
Figure 4:
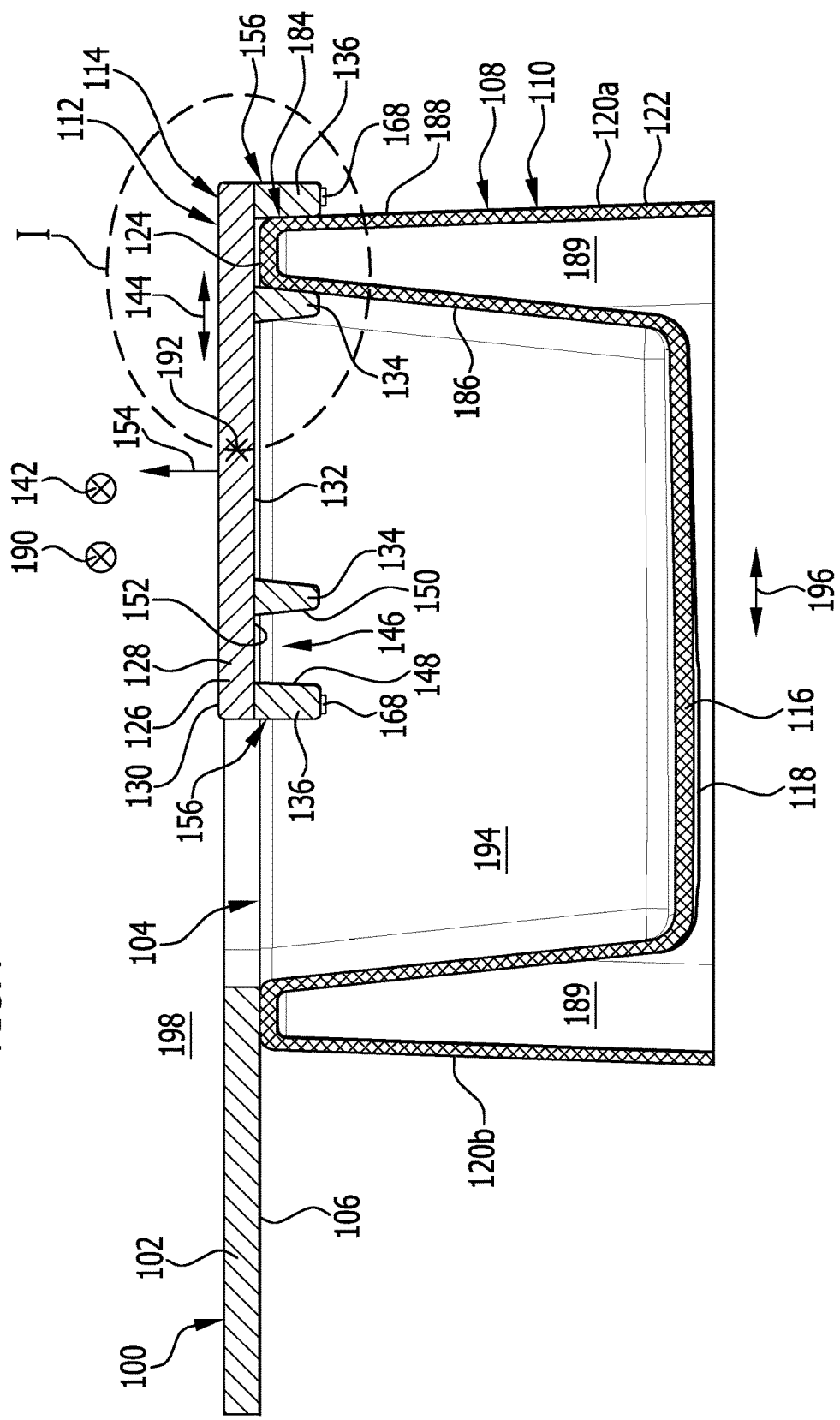
FIG. 4 shows a vertical cut through the combination comprising sink, work surface, and sink attachment from FIGS. 1 to 3, along the line 4-4 in FIG. 3.

A combination 100 depicted in FIGS. 1 to 12 comprises a work surface 102 with a work surface section 104, a sink 108 arranged on an underside 106 of the work surface 102 with a basin 110 and a sink attachment 112 configured to be arranged on the basin 110, this sink attachment 112 being configured as a cutting board 114 in this embodiment.

Figure 13:
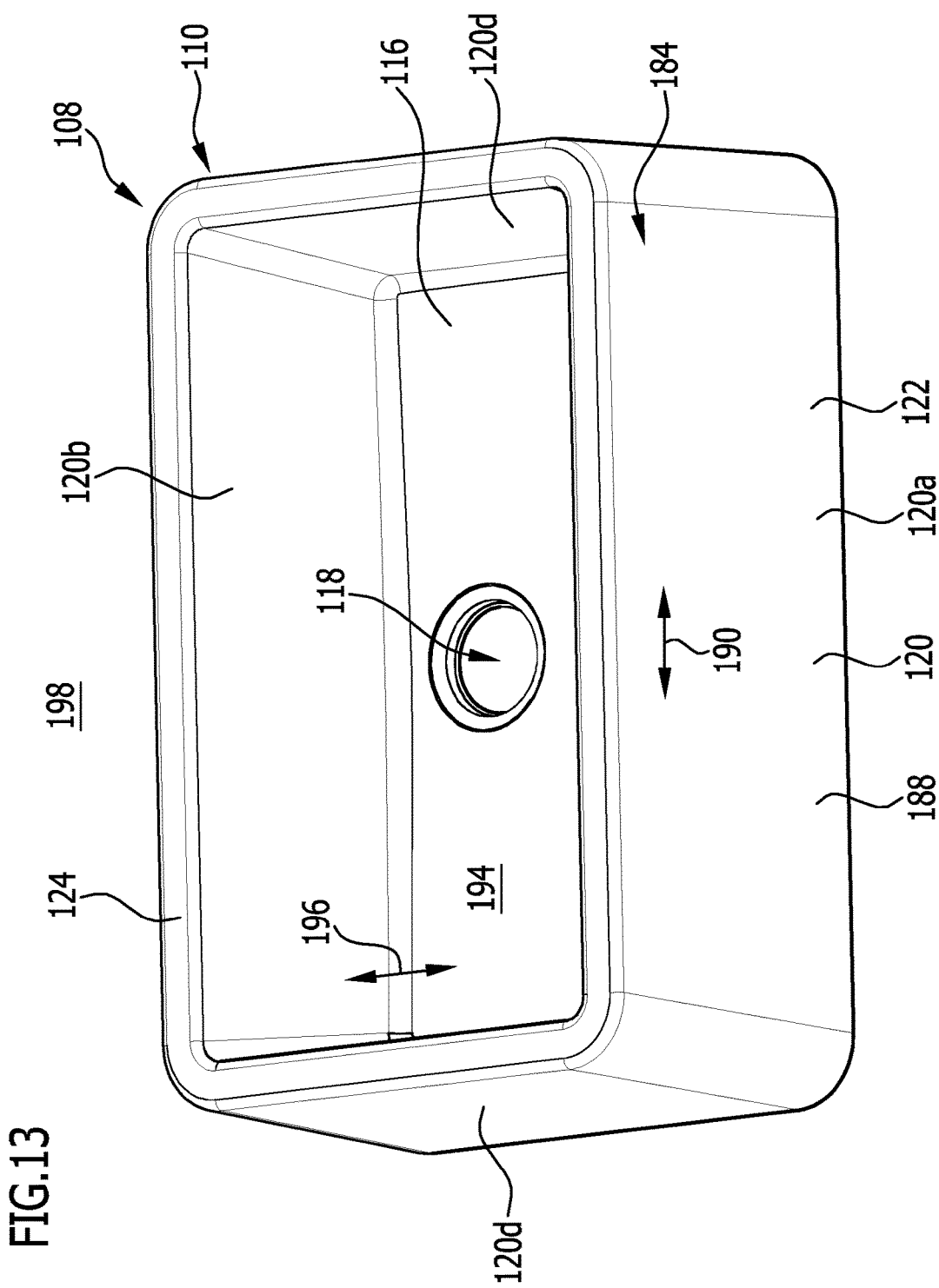
FIG. 13 shows a perspective depiction of the sink from FIGS. 1 to 12 without the work surface and without the sink attachment.
Figure 14:
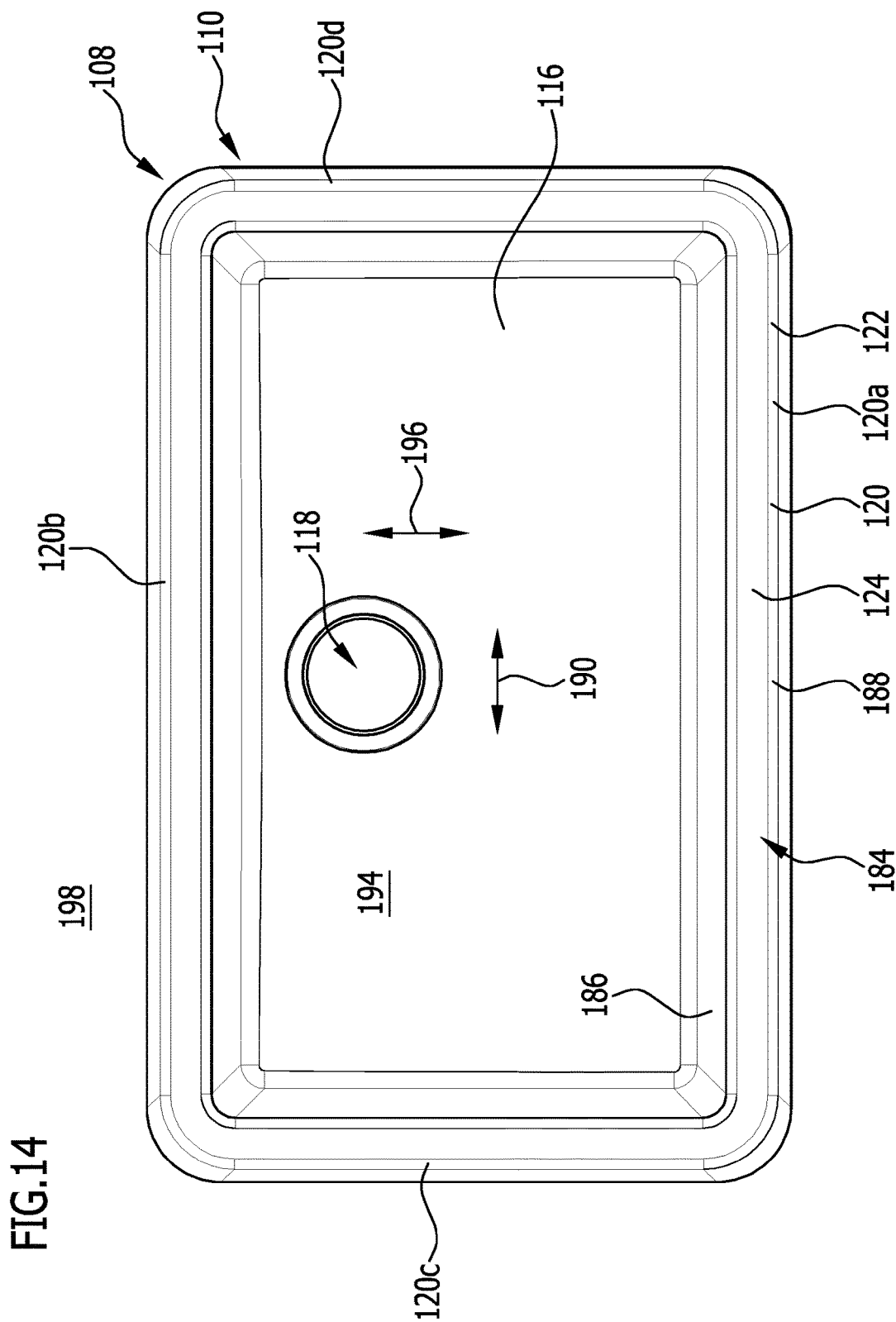
FIG. 14 shows a top view from above onto the sink from FIG. 13.
Figure 15:
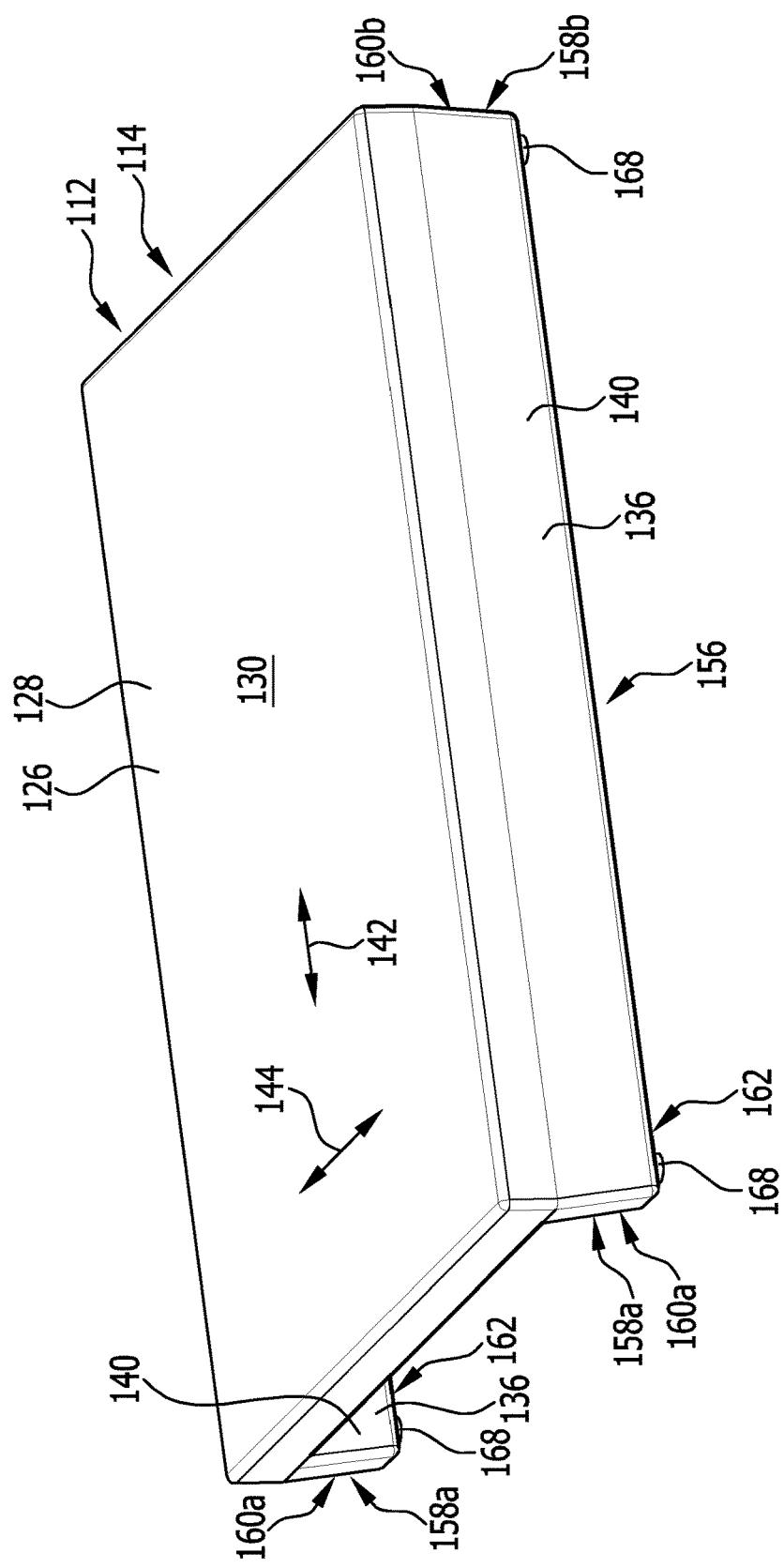
FIG. 15 shows a perspective depiction of the sink attachment from FIGS. 1 to 12, with a view onto an upper side of the sink attachment.
Figure 16:
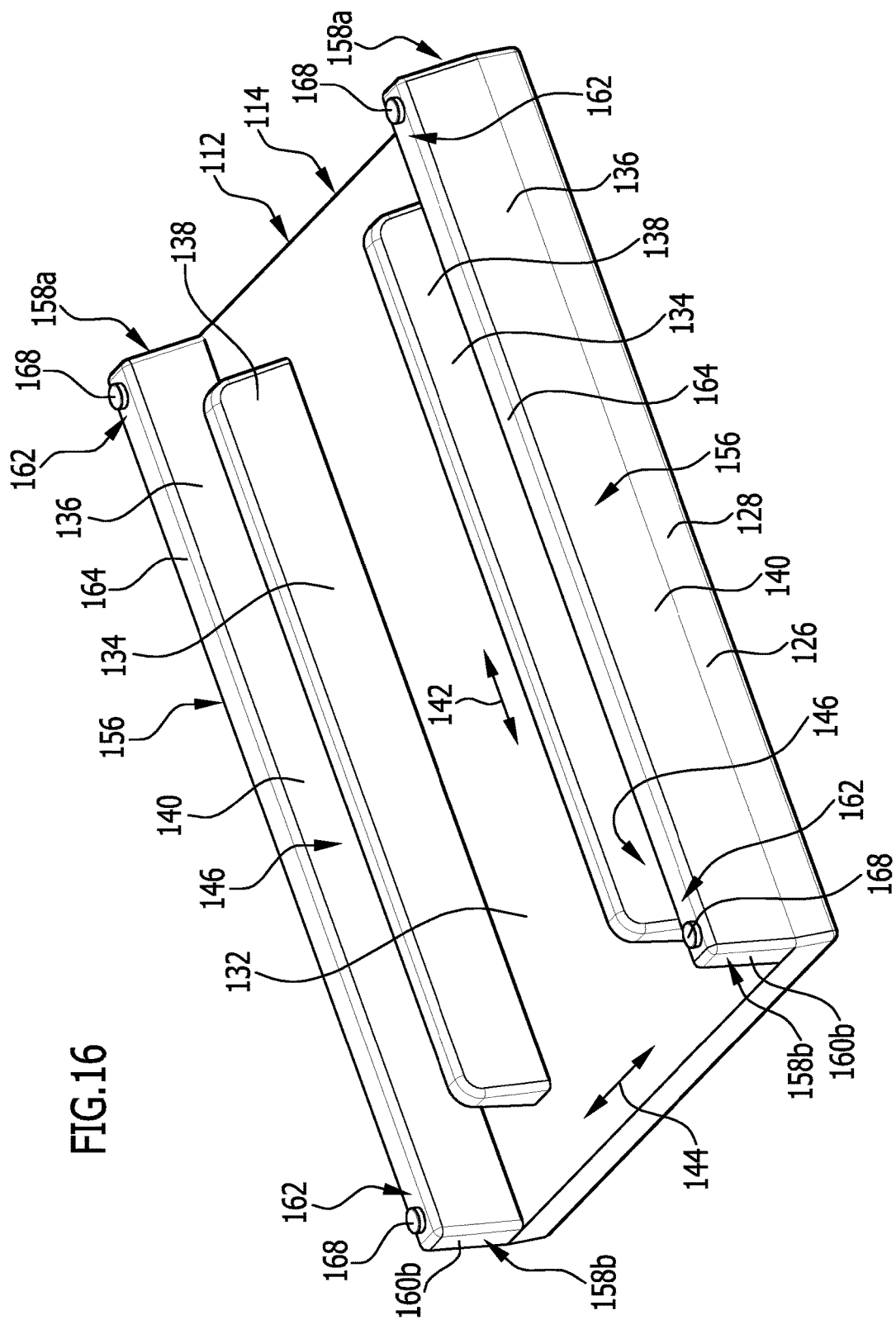
FIG. 16 shows a perspective depiction of the sink attachment from FIG. 15, with a view onto an underside of the sink attachment.
Figure 17:
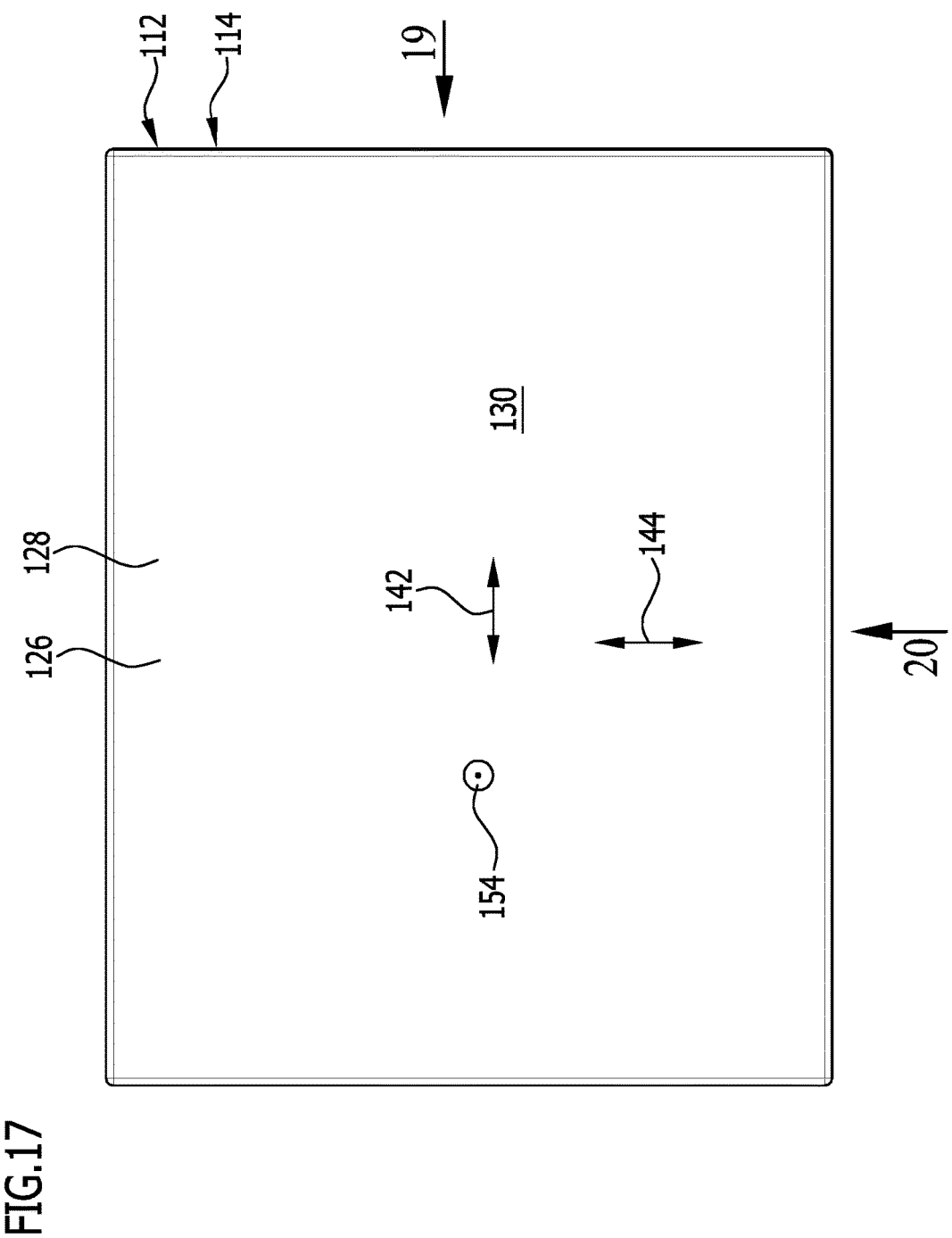
FIG. 17 shows a top view from above onto the sink attachment from FIGS. 15 and 16.

The basin 110 individually depicted in FIGS. 13 and 14 comprises a bottom region 116, in which a basin drain opening 118 is provided, as well as sidewalls 120 extending nearly vertically from the bottom region 116 upward, in particular a front first sidewall 120a, which serves as a coupling sidewall 122 in this embodiment example, a rear second sidewall 120b opposite to the coupling sidewall 122, a left sidewall 120c, and a right sidewall 120d, wherein the left sidewall 120c and the right sidewall 120d connect the coupling sidewall 122 and the sidewall 120b to each other.

Furthermore, the basin 110 comprises a basin rim 124 oriented substantially horizontally, running along the upper rims of the sidewalls 120.

The basin 110 is preferably formed as one piece.

The basin 110 may, in principle, be made of any material, for example of a stainless steel material, a ceramic material, a plastics material, or a composite material.

The sink 108 may comprise, in addition to the at least one basin 110, further basins and/or one or more draining surfaces.

The sink attachment 112 individually depicted in FIGS. 15 to 20 that is configured, for example, in the form of a cutting board 114 comprises a base body 126 which itself comprises a—preferably substantially cuboid-shaped-baseplate 128 whose upper side forms a supporting face 130 of the sink attachment 112.

On an underside 132 of the baseplate 128 facing away from the supporting face 130 (cf. in particular FIGS. 16 and 18), two inner coupling elements 134 and two outer coupling elements 136 are arranged, which are each formed as bars 138 and 140, respectively, and each extend in a longitudinal direction 142 of the sink attachment 112, and are spaced apart from each other in a transverse direction 144 of the sink attachment 112 running perpendicular to the longitudinal direction 142 of the sink attachment 112 and preferably parallel to the supporting face 130.

In particular, both outer coupling elements 136 each run along an outer edge of the baseplate 128, preferably along one long side of the baseplate 128 each.

Each inner coupling element 134 runs parallel to the longitudinal direction 142 spaced apart from the respective adjacent outer coupling element 136.

In the depicted embodiment example, the inner coupling elements 134 are formed shorter than the outer coupling elements 136.

It may, in principle, also be provided, however, that the inner coupling elements 134 are formed equally as long as the outer coupling elements 136, or the inner coupling elements 134 may be formed longer than the outer coupling elements 136.

Each outer coupling element 136 and its corresponding adjacent inner coupling element 134, together with the base body 126, bound a receiving space 146 for an upper rim region of one of the sidewalls 120, in particular of the front coupling sidewall 122.

Said receiving space 146 is bound by an outer seating face 148 of the respective outer coupling element 136 facing the inner coupling element 134, by an inner seating face 150 of the inner coupling element 134 facing the outer coupling element 136, and by a region 152 of the underside 132 of the base body 126 connecting the outer seating face 148 to the inner seating face 150.

The base body 126 and/or the coupling elements 134 and/or 136 may, for example, be made of a wood material (for example laminated wood) or of a plastics material.

The coupling elements 134, 136 may, for example, be fixed on the base body 126 by means of dowels, screws, and/or by adhesion.

Figure 19:
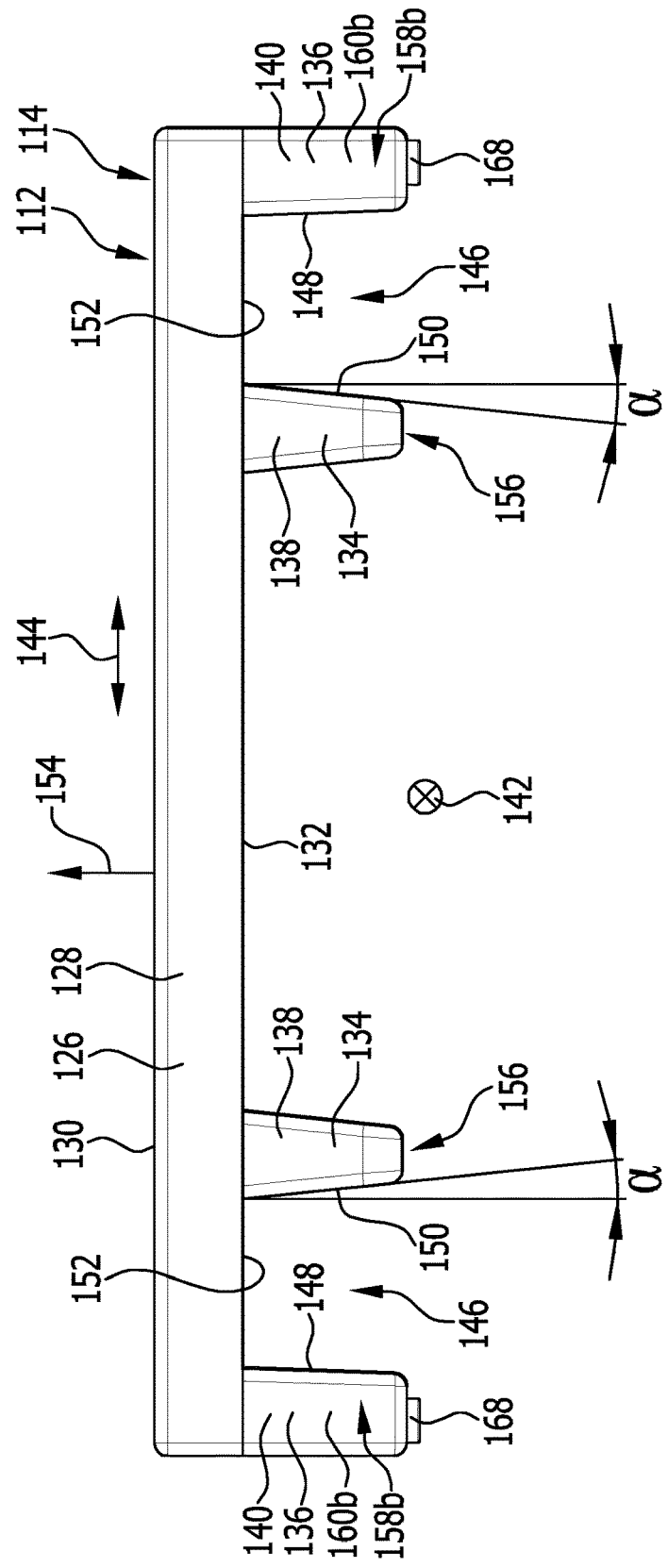
FIG. 19 shows a front view of the sink attachment from FIGS. 15 to 18, with the viewing direction in the direction of the arrow 19 in FIG. 17.

As can best be seen in FIG. 19, each coupling element 134 or 136 may have a substantially rectangular cross section or a substantially trapezoid-shaped cross section.

An outer coupling element 136 preferably has a substantially rectangular cross section, while an inner coupling element 134 preferably has a trapezoid-shaped cross section, wherein it may be provided, in particular, that the thickness of the coupling element 134 increases with decreasing distance from the base body 126.

If the supporting face 130 of the sink attachment 112 is oriented horizontally, then the inner seating face 150 of an inner coupling element 134 is preferably tilted with respect to the vertical about an angle a, wherein a normal direction 154 of the supporting face 130, in this position of the sink attachment 112, is oriented in parallel to the vertical (cf. FIG. 19).

The angle α is preferably at least about 1°, in particular at least about 3°, particularly preferably at least about 6°, and/or preferably maximally about 20°, in particular maximally about 10°, particularly preferably maximally about 8°.

Each inner coupling element 134 and its adjacent outer coupling element 136 form a coupling device 156 for coupling the sink attachment 112 to the coupling sidewall 122 of the basin 110 in a working position of the sink attachment 112.

In the depicted embodiment, the sink attachment 112 additionally comprises a first face-side coupling device 158*a* for coupling the sink attachment 112 to the coupling sidewall 122 and a second face-side coupling device 158*b* for coupling the sink attachment 112 to the sidewall 120*b* opposite to the coupling sidewall 122 in a transverse position, in which the longitudinal direction 142 of the sink attachment 112 is rotated about an angle of 90° with respect to the working position, in which the sink attachment 112 is coupled by means of the coupling device 156 to the coupling sidewall 122.

Figure 18:
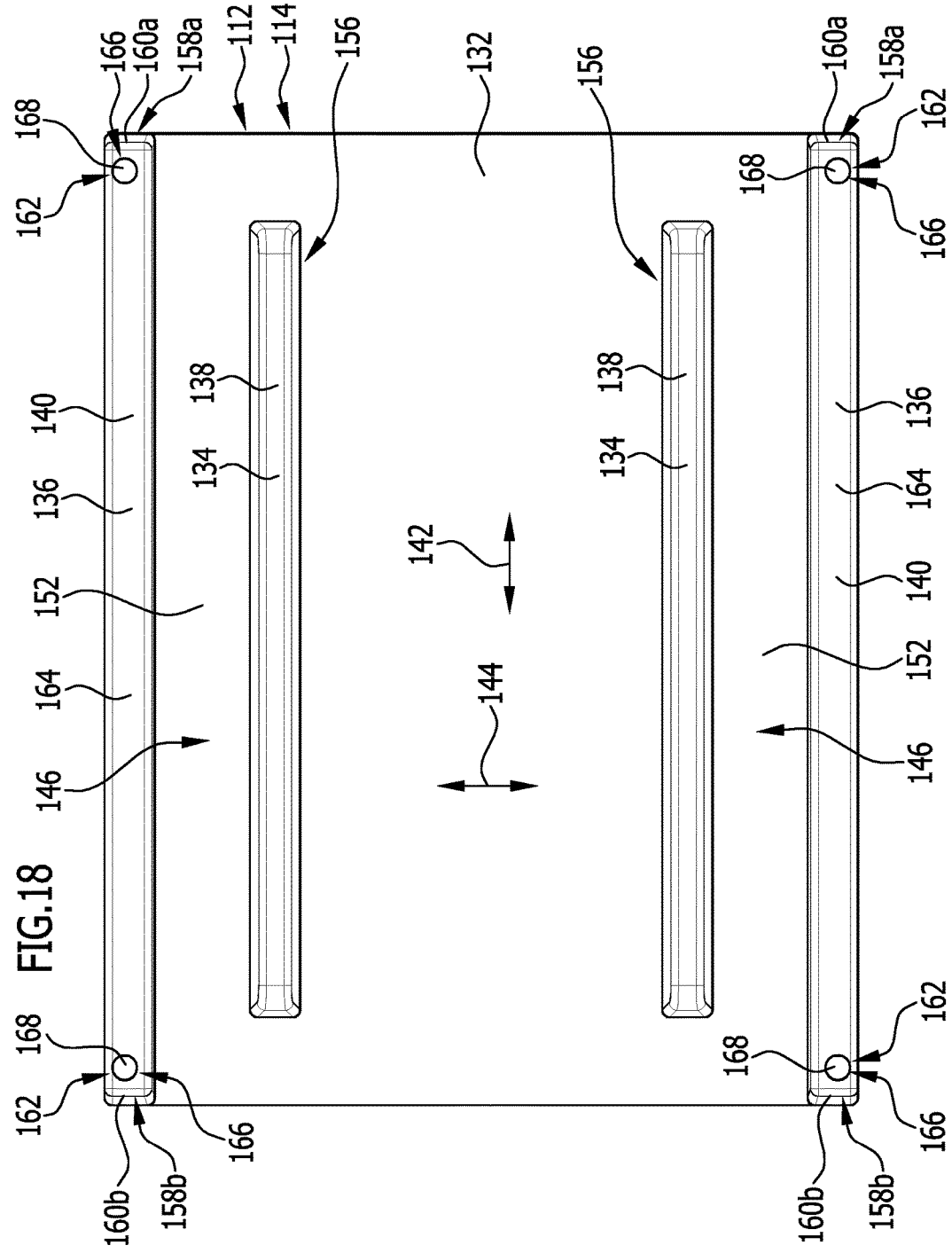
FIG. 18 shows a top view from below onto the sink attachment from FIGS. 15 to 17.

The first face-side coupling device 158*a* comprises first face-side seating faces 160*a*, on the end regions of the outer coupling elements 136 depicted on the right in FIG. 18.

The second face-side coupling device 158*b* comprises second face-side seating faces 160*b*, which are arranged on the end regions of the outer coupling elements 136 depicted on the left in FIG. 18.

Figure 20:
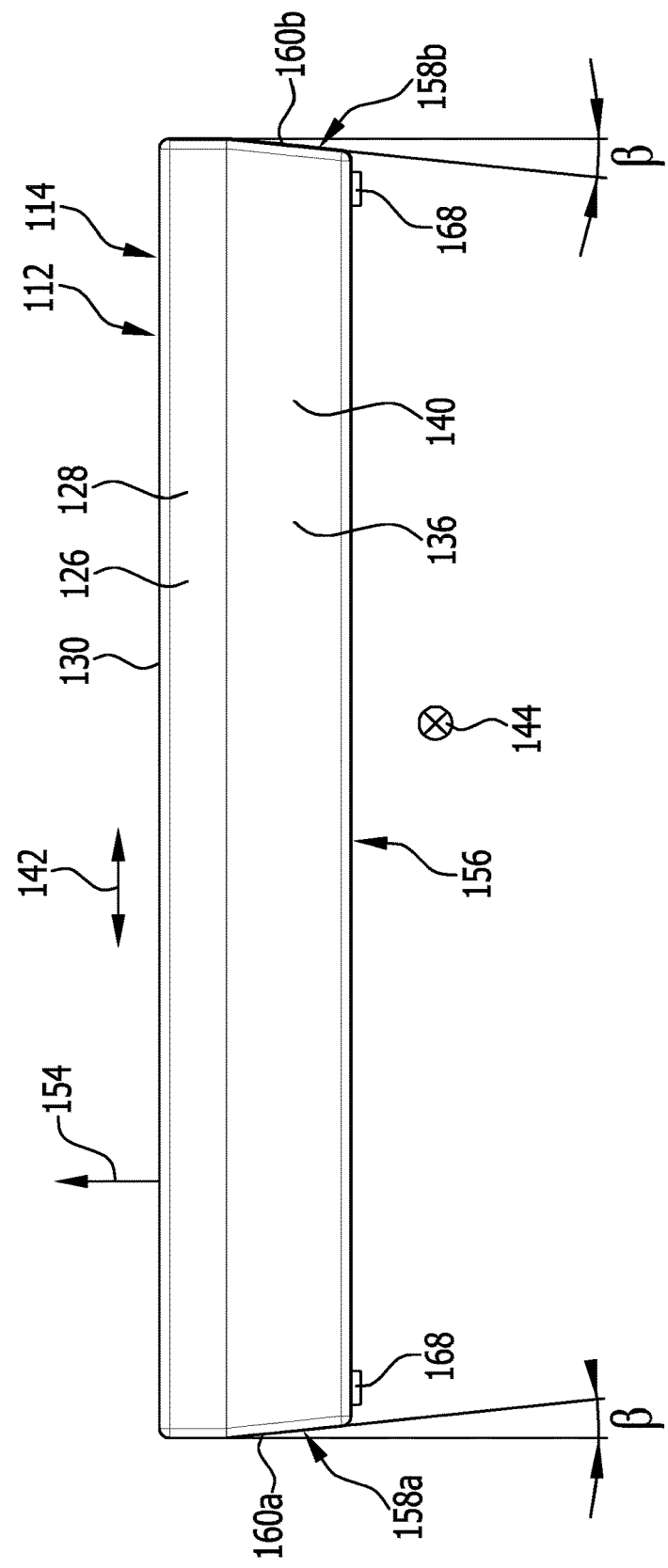
FIG. 20 shows a side view of the sink attachment from FIGS. 15 to 19, with the viewing direction in the direction of the arrow 20 in FIG. 17.
Figure 21:
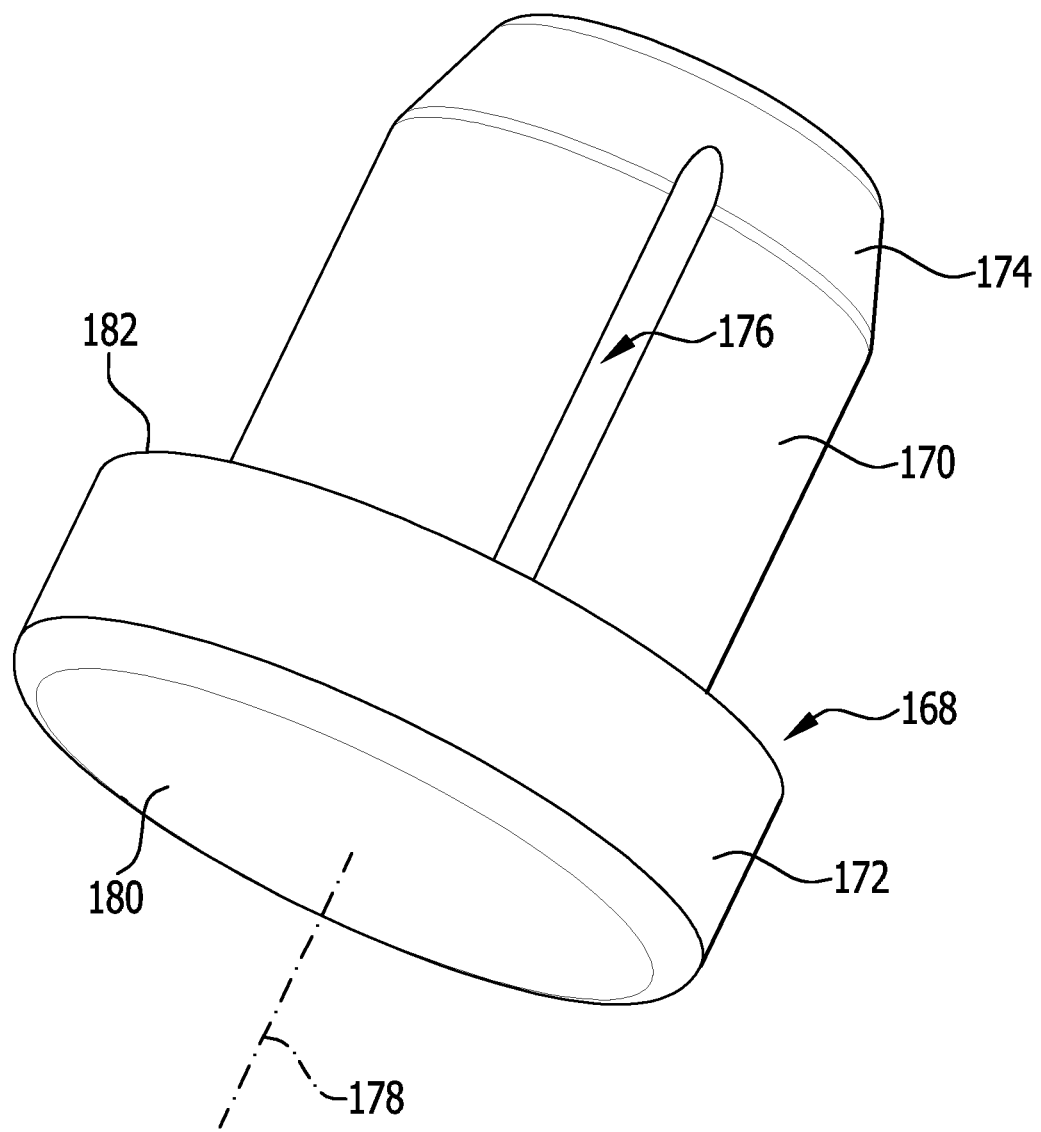
FIG. 21 a perspective depiction of a supporting element of the sink attachment from FIGS. 15 to 20.

As is best seen from the side view of the sink attachment 112 in FIG. 20, the face-side seating faces 160*a*, 160*b* are tilted about an angle β with respect to the normal direction 154 of the supporting face 130 of the sink attachment 112, and thereby tilted with respect to the vertical, when the supporting face 130 of the sink attachment 112 is oriented horizontally.

The angle β is thereby preferably substantially equally as large as the angle α, about which the inner seating faces 150 of the inner coupling elements 134 of the coupling device 156 are tilted with respect to the normal direction 154 of the supporting face 130 and with respect to the vertical, respectively, when the supporting face 130 of the sink attachment 112 is oriented horizontally.

Furthermore, the angle β is preferably at least about 1°, in particular at least about 3°, particularly preferably at least about 6°, and/or preferably maximally about 20°, in particular maximally about 10°, particularly preferably maximally about 8°.

The tilted face-side seating faces 160*a*, 160*b* may be produced, for example, by a milling process on the outer coupling elements 136.

As is best seen in the FIGS. 18 and 19, end regions 162 of the undersides 164 of the outer coupling elements 136 of the sink attachment 112 are each provided with at least one recess 166, in each of which one supporting element 168 is at least partially received.

One such supporting element 168 is depicted individually in FIGS. 21 to 24.

The supporting element 168 comprises a substantially cylindrical shank 170 that has a likewise substantially cylindrical head 172 which has a greater external diameter than the shank 170.

The end region of the shaft 170 facing away from the head 172 is provided with a chamfer 174.

Figure 22:
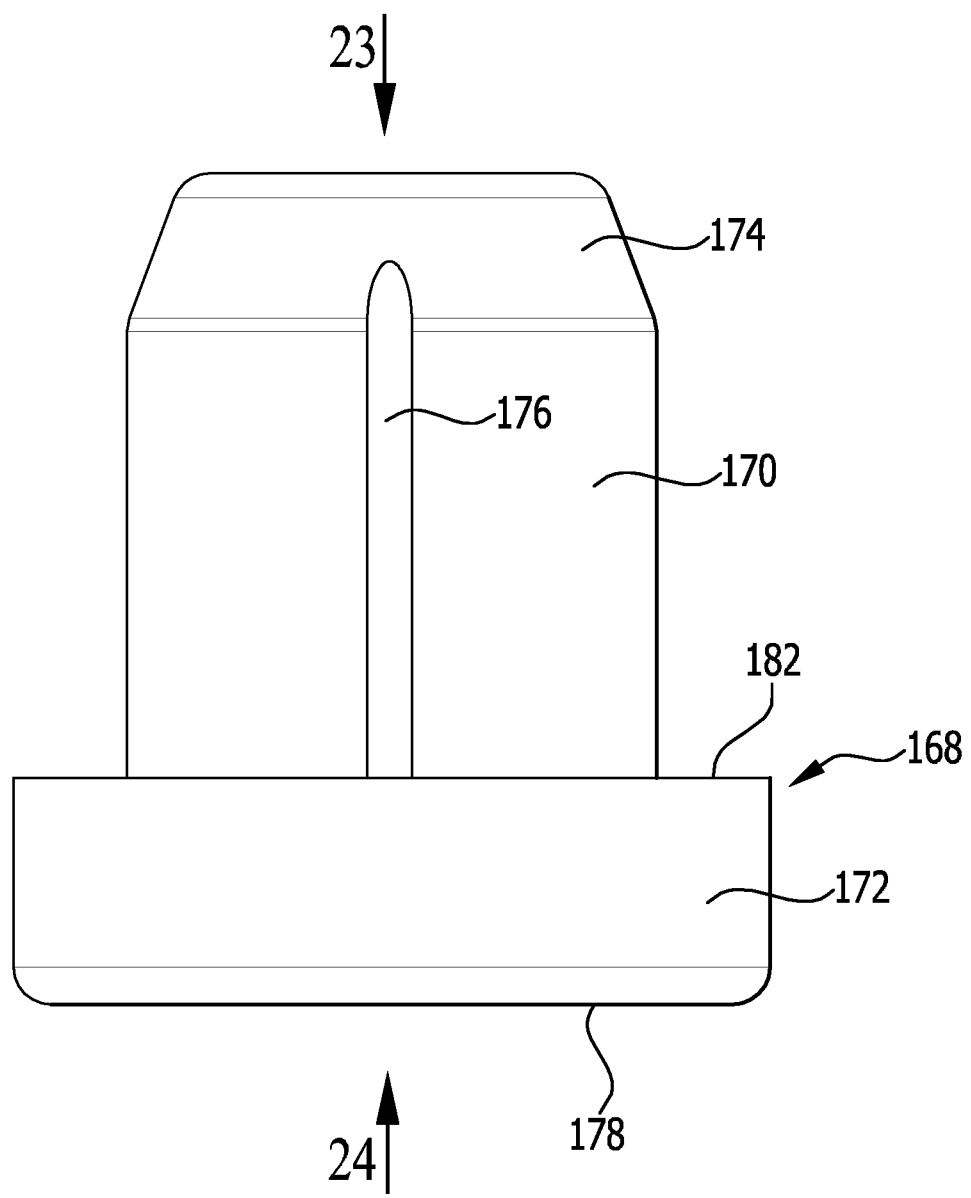
FIG. 22 shows a side view of the supporting element from FIG. 21.
Figure 23:
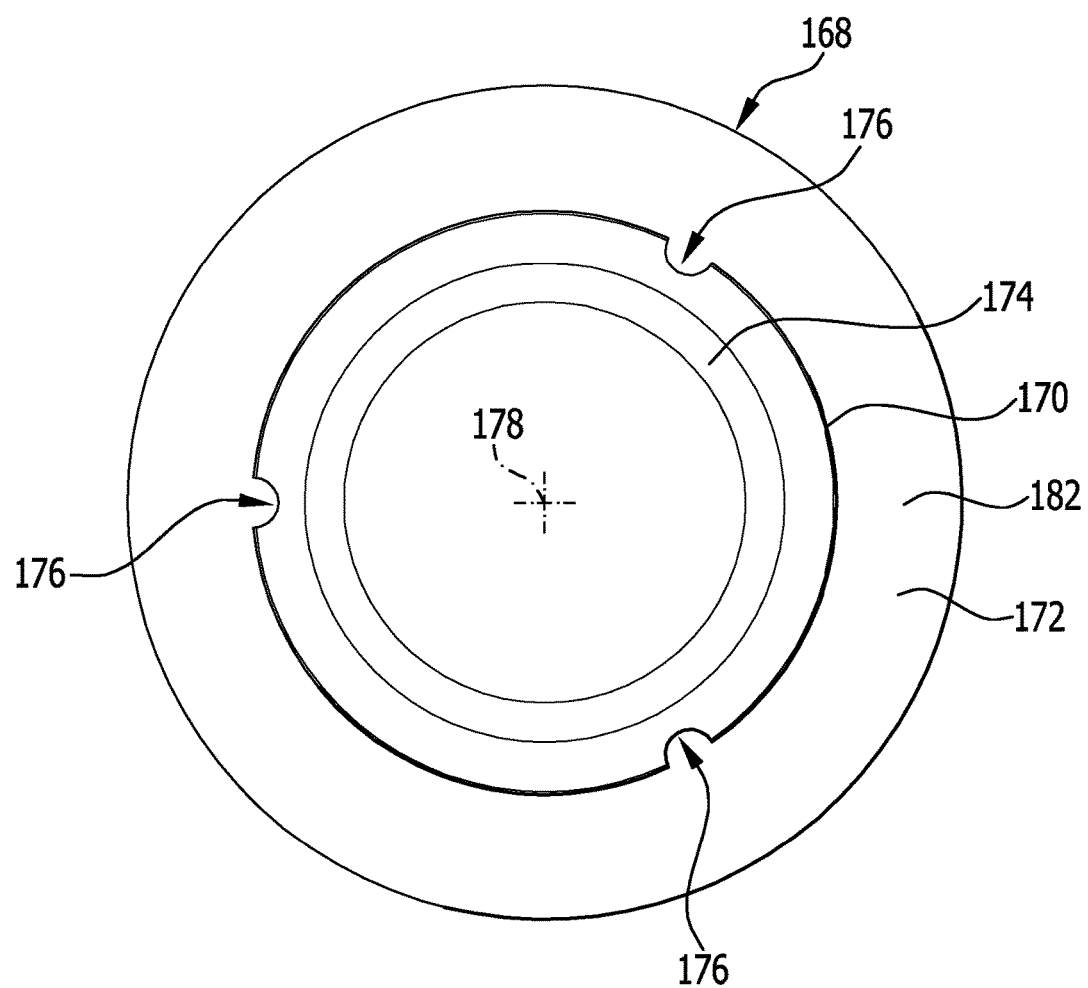
FIG. 23 shows a top view from above onto the supporting element from FIGS. 21 and 22, with the viewing direction in the direction of the arrow 23 in FIG. 22.
Figure 24:
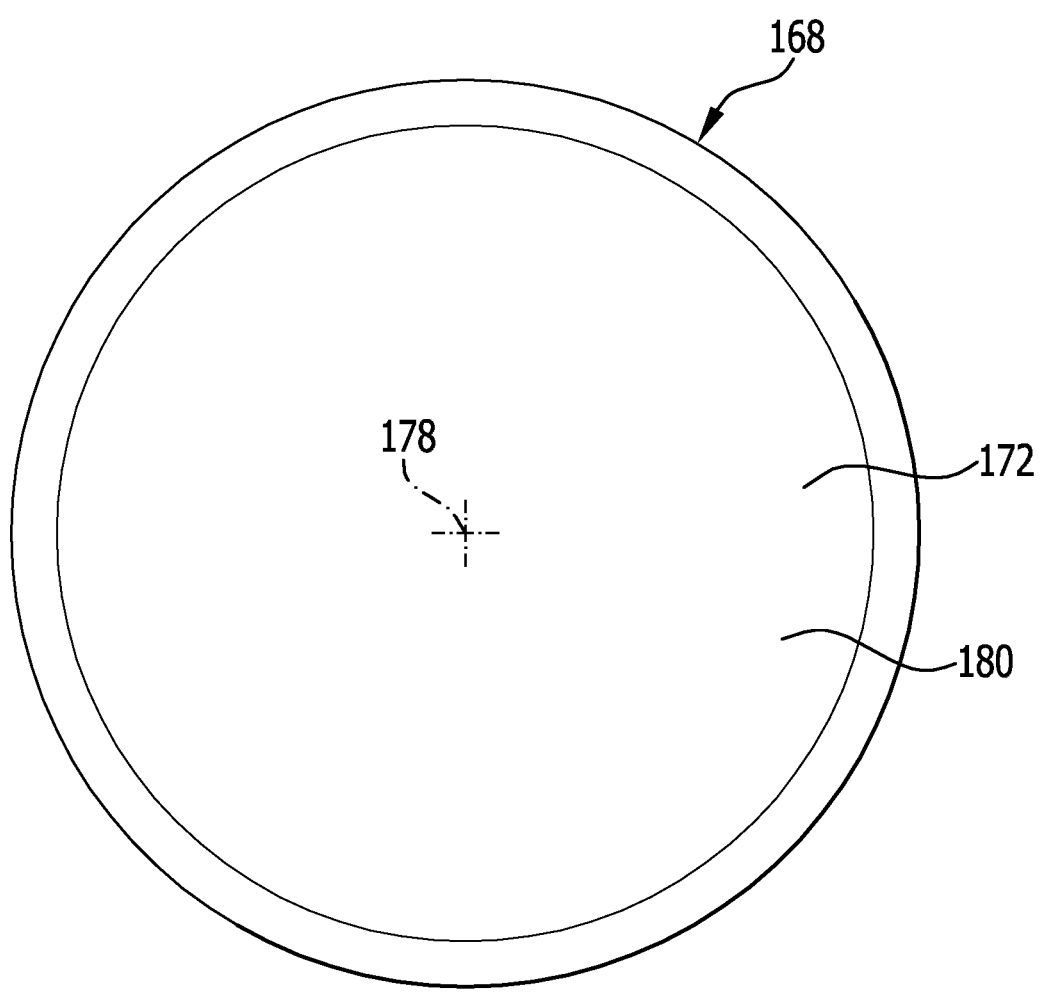
FIG. 24 shows a top view from below onto the supporting element from FIGS. 21 to 23, with the viewing direction in the direction of the arrow 24 in FIG. 22.

As is best seen in FIGS. 22 and 23, multiple grooves 176, for example three grooves 176, extend from an end region of the shank 170 facing the head 172, parallel to the longitudinal middle axis 178 of the support element 168, into the region of the chamfer 174.

The grooves 176 are preferably distributed substantially equidistant about the longitudinal middle axis 178 of the supporting element 168 in the circumferential direction of the shank 170.

The head 172 of the supporting element 168 has a front face 180 facing away from the shank 170, whose outer edge may be rounded off.

The supporting element 168 comprising shank 170 and head 172 is preferably integrally formed.

The supporting element 168 is preferably made of a friction-increasing material.

The supporting element 168 may be made of a plastics material, in particular of an elastomer material, for example of a silicone material.

The supporting element 168 is preferably produced separately from the outer coupling element 136 of the sink attachment 112 and is later fixed to the outer coupling element 136, wherein the shank 170 of the supporting element 168 is received in the respective corresponding recess 166 in one of the end regions 162 of the underside 164 of the outer coupling elements 136 and the head 172 of the respective supporting element 168 protrudes out over the respective recess 166.

Here, a seating face 182 of the head 172 of the supporting element 168 protruding over the shank 170 in a radial direction of the longitudinal middle axis 178 of the supporting element 168 preferably abuts the region of the respective underside 164 of an outer coupling element 136 surrounding the recess 166.

The supporting element 168 may be fixed to the respective coupling element 136 by, for example, force fit and/or by adhesion.

Alternatively to this, it may also be provided that the supporting element 168 is produced in situ on the coupling element 136, for example through an injection process with a material suitable for injection molding.

The sink attachment 112 can be put on the basin 110 in the longitudinal position or work position depicted in FIGS. 1 to 6, in which the sink attachment 112 is coupled by means of the coupling device 156 to the coupling sidewall 122, by bringing the sink attachment 112 onto the basin from the top, until an upper rim region 184 of the coupling sidewall 122 is inserted into the receiving space 146 of the sink attachment 112 bound by an outer coupling element 136 and an inner coupling element 134.

Figure 5:
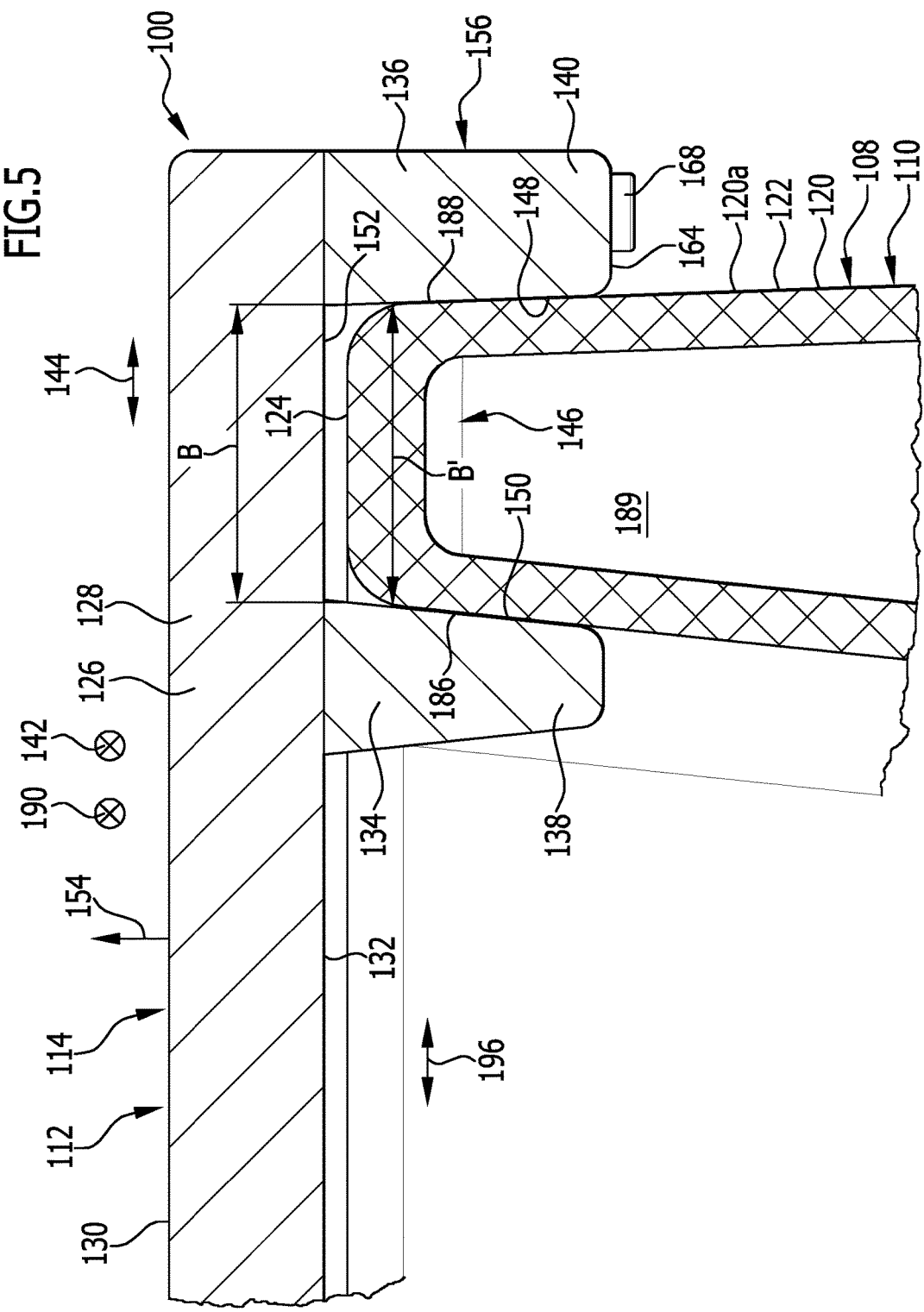
FIG. 5 shows an enlarged depiction of region I from FIG. 4.
Figure 6:
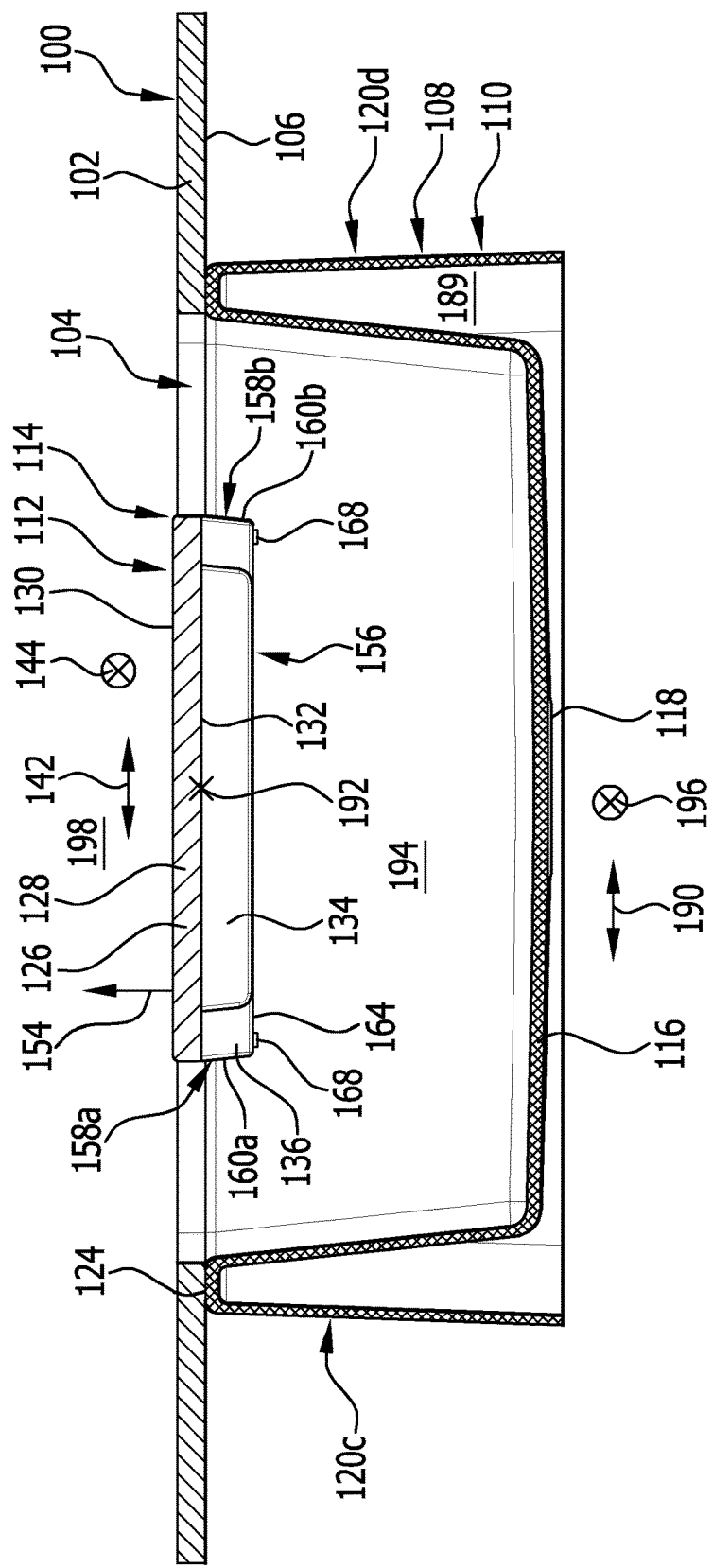
FIG. 6 shows a vertical cut through the combination comprising sink, work surface, and sink attachment from FIGS. 1 to 3, along the line 6-6 in FIG. 3.
Figure 7:
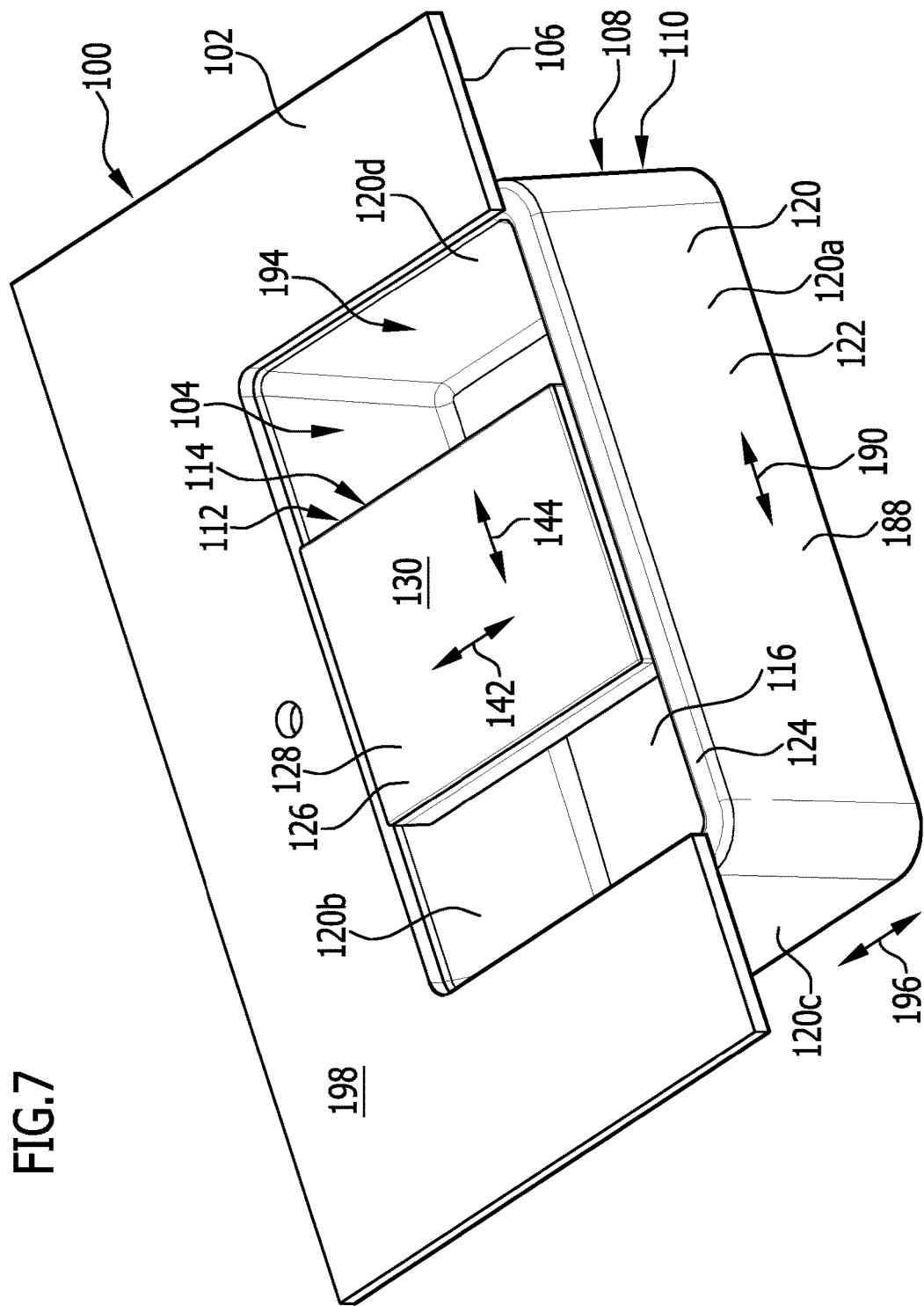
FIG. 7 shows a perspective depiction of the combination comprising sink, work surface, and sink attachment from FIGS. 1 to 6, wherein the sink attachment in a transverse position, in which the longitudinal direction of the sink attachment is rotated about an angle of 90° with respect to the working position depicted in FIGS. 1 to 6, is arranged on the basin of the sink, wherein the sink attachment is coupled by a first face-side coupling device to the front coupling sidewall of the basin and is coupled by a second face-side coupling device to another sidewall of the basin of the sink opposite to the coupling sidewall.
Figure 8:
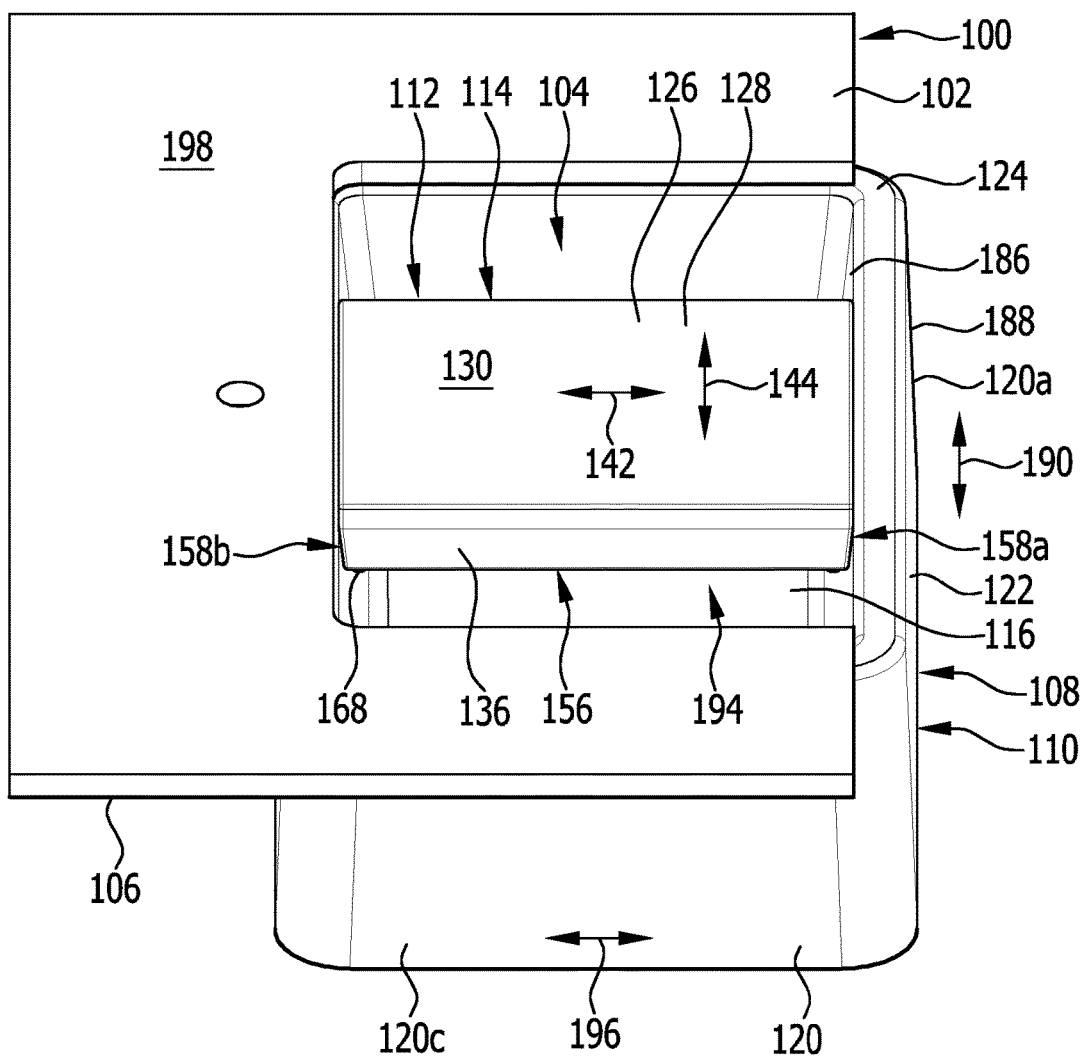
FIG. 8 shows another perspective depiction of the combination comprising sink, work surface, and sink attachment from FIG. 7, with the viewing direction parallel to the long sides of the basin.
Figure 9:
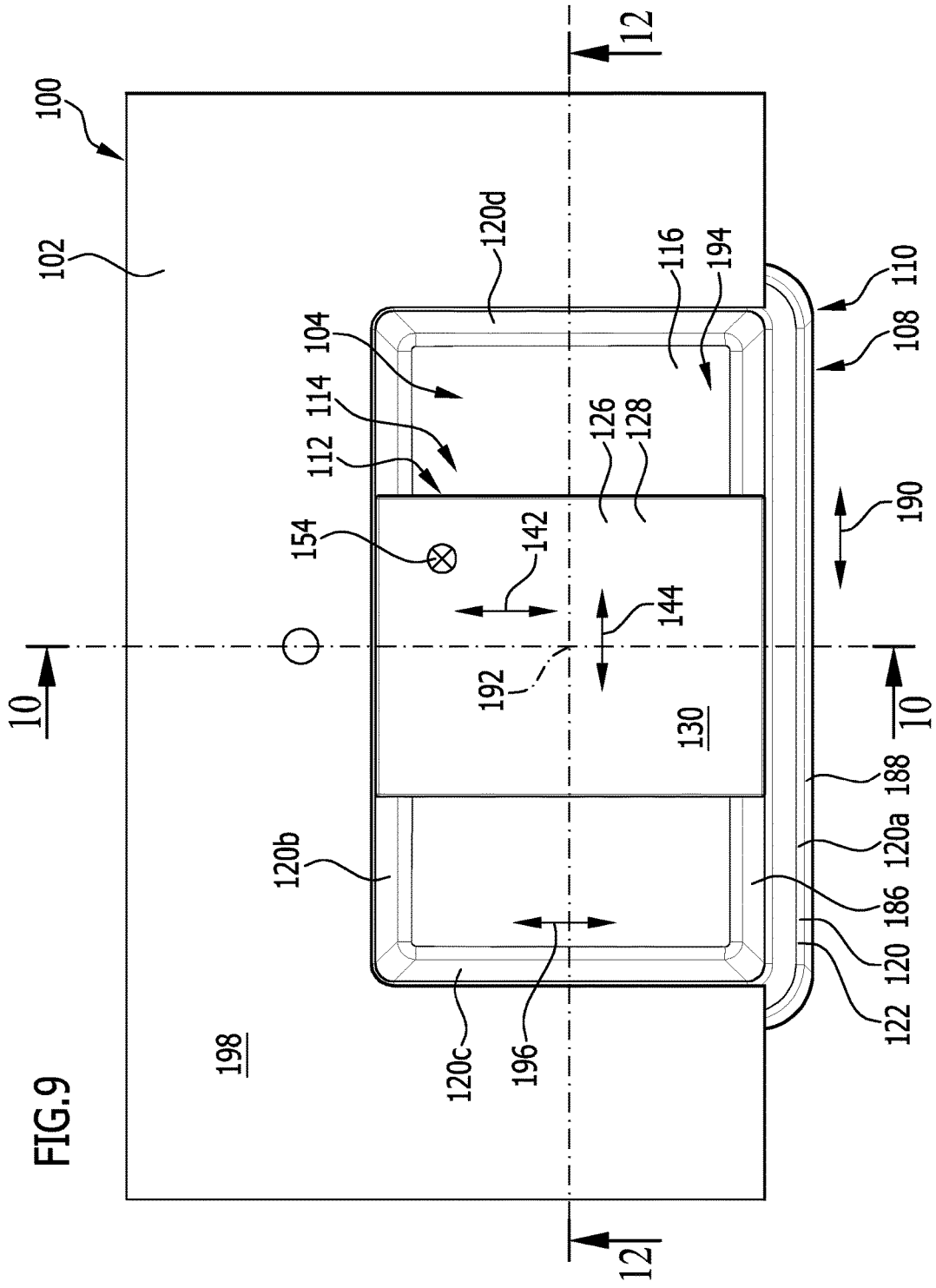
FIG. 9 shows a top view from above onto the combination comprising sink, work surface, and sink attachment from FIGS. 7 and 8.

As is best seen in the cross section in FIG. 5, the upper rim region 184 of the coupling sidewall 122 tapers upward to the basin rim 124, which has a width B', which is less than the distance B between the inner seating face 150 and the outer seating face 148 of the coupling elements 134, 136 on the underside 132 of the base body 126.

If the sink attachment 112 is put so far onto the coupling sidewall 122 that the inner seating face 150 of the inner coupling element 134 abuts the inner side 186 of the coupling sidewall 122 and the outer seating face 148 of the outer coupling element 136 abuts the outer side 188 of the coupling sidewall 122, then the region 152 of the underside 132 of the base body 126 that connects the outer seating face 148 to the inner seating face 150 is spaced apart from the coupling sidewall 122 of the basin 110.

Thus, it is achieved that manufacturing tolerances of the basin 110 and/or of the sink attachment 112 can be accommodated for by the remaining free space between the underside 132 of the base body 126 of the sink attachment 112 and the basin rim 124 of the basin 110.

The inner side 186 of the coupling sidewall 122 and/or the outer side 188 of the coupling sidewall 122 preferably have substantially the same tilt with respect to the vertical in the upper rim region 184 of the coupling sidewall 122 (in the assembled state of the sink 108) as the inner seating face 150 of the inner coupling element 134 and as the outer seating face 148 of the outer coupling element 136, respectively, when the supporting face 130 of the sink attachment 112 is oriented horizontally.

Thus, an area contact seating of the coupling elements 134 and 136, respectively, with the inner side 186 and with the outer side 188 of the coupling side wall 122 of the basin 110, respectively, is achieved.

The coupling sidewall 122 may, as depicted, have a cavity 189 arranged between the inner side 186 and the outer side 188. Alternatively to this, the coupling sidewall 122 may be formed solidly.

In the working position of the sink attachment 112 depicted in FIGS. 1 to 6, the longitudinal direction 142 of the sink attachment 112 is oriented in parallel to the longitudinal direction 190 of the sink 108, along which the coupling sidewall 122 extends.

In this working position, the part of the sink attachment 112 which is arranged on that side of the inner coupling element 134 that is in contact with the coupling sidewall 122, which is facing away from the outer coupling element 136 that is in contact with the coupling sidewall 122, and which contains the center of gravity 192 of the sink attachment 112, protrudes out over the interior 194 of the basin 110, without resting on the sidewall 120b of the basin 110 opposite to the coupling sidewall, or on the work surface 102 covering said sidewall 120b.

Here, the positive connection between the coupling device 156 (comprising the inner coupling element 134 and the outer coupling element 136) and the coupling sidewall 122 prevents the sink attachment 112 from tipping out of the working position, in which the supporting face 130 of the sink attachment 112 is oriented horizontally, into the interior 194 of the basin.

The positive connection between the coupling device 156 and the coupling sidewall 122 further prevents the sink attachment 112 from shifting relative to the basin 110 in the transverse direction 196 of the sink 108, running perpendicular to the longitudinal direction 190 of the sink 108 and oriented horizontally in the assembled state of the sink 108.

The sink attachment 112 can, however, be shifted relative to the basin 110 in the longitudinal direction 190 of the sink 108, in particular by the outer seating face 148 and the inner seating face 150 gliding on the outer side 188 and on the inner side 186, respectively, of the coupling sidewall 122.

The sink attachment 112 is preferably formed symmetrically with respect to a rotational axis running through the center of gravity 192 and running perpendicular to the supporting face 130, such that the sink attachment 112 may also be arranged on the basin 110 in a second working position rotated about the rotational axis about an angle of 180°, in which the coupling elements 134, 136 not used in the first working position are in contact with the coupling sidewall 122.

Alternatively to the arrangement of the sink attachment 112 in the longitudinal position or working position on the basin 110, the sink attachment 112 may be put in the transverse position depicted in FIGS. 7 to 12 coupled to the coupling sidewall 112 or the opposing side wall 120b, respectively, by means of the face-side coupling devices 158a and 158b, by introducing the sink attachment 112 into the basin 110 from above, until the face-side seating faces 160a, 160b of the face-side coupling devices 158a, 158b abut the inner side 186 of the coupling side wall 122 and the inner side 186 of the side wall opposite to the coupling side wall 122, respectively.

In this coupled position of the sink attachment 112, the supporting elements 168 are spaced apart from the bottom region 116 of the basin 110, such that the sink attachment 112 in the coupled position is not in contact with the bottom region 116.

Furthermore, the sink attachment 112 in this transverse position is not in contact with the basin rim 124 of the basin 110 and also not in contact with the work surface 102.

Figure 10:
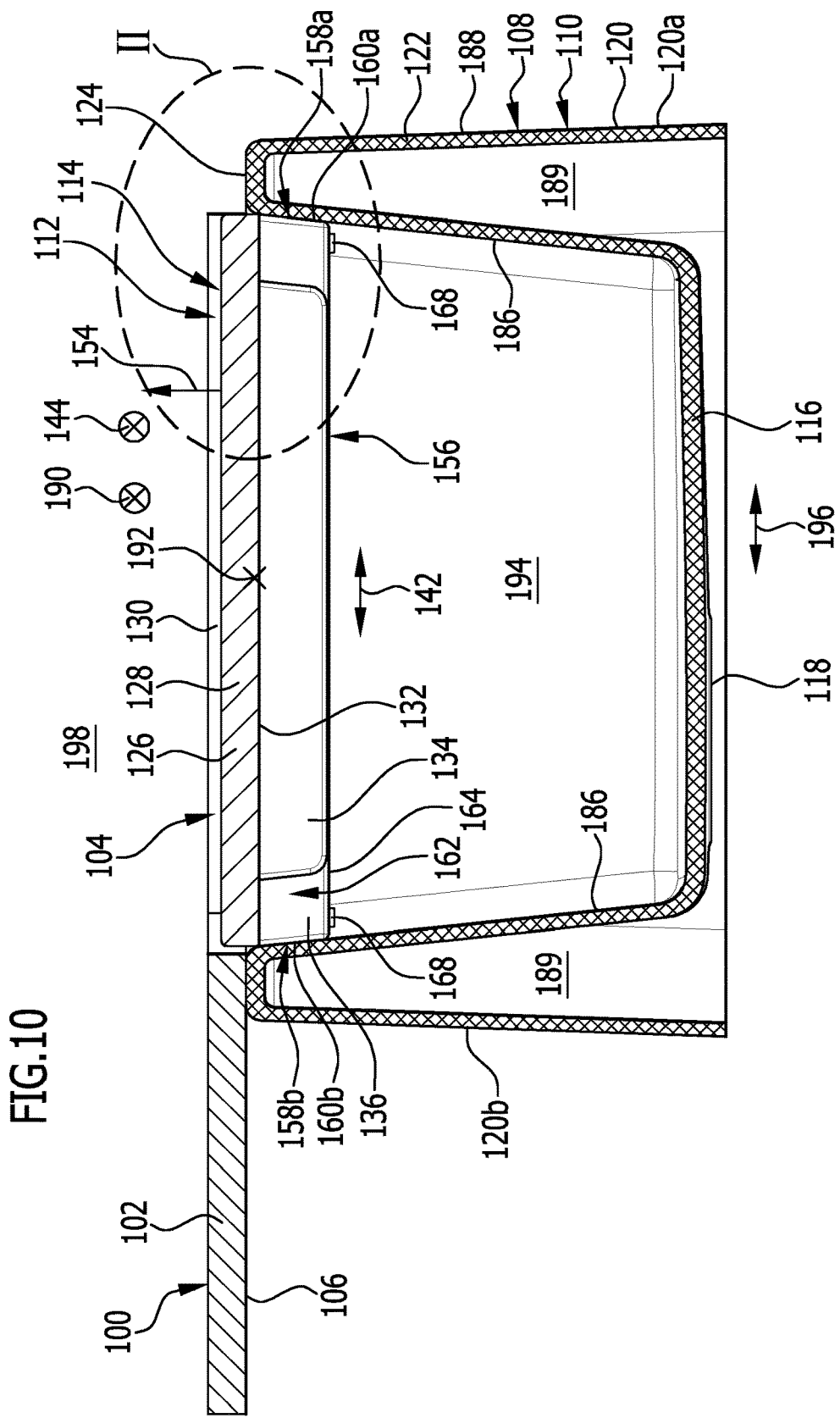
FIG. 10 shows a vertical cut through the combination comprising sink, work surface, and sink attachment from FIGS. 7 to 9, along the line 10-10 in FIG. 9.
Figure 11:
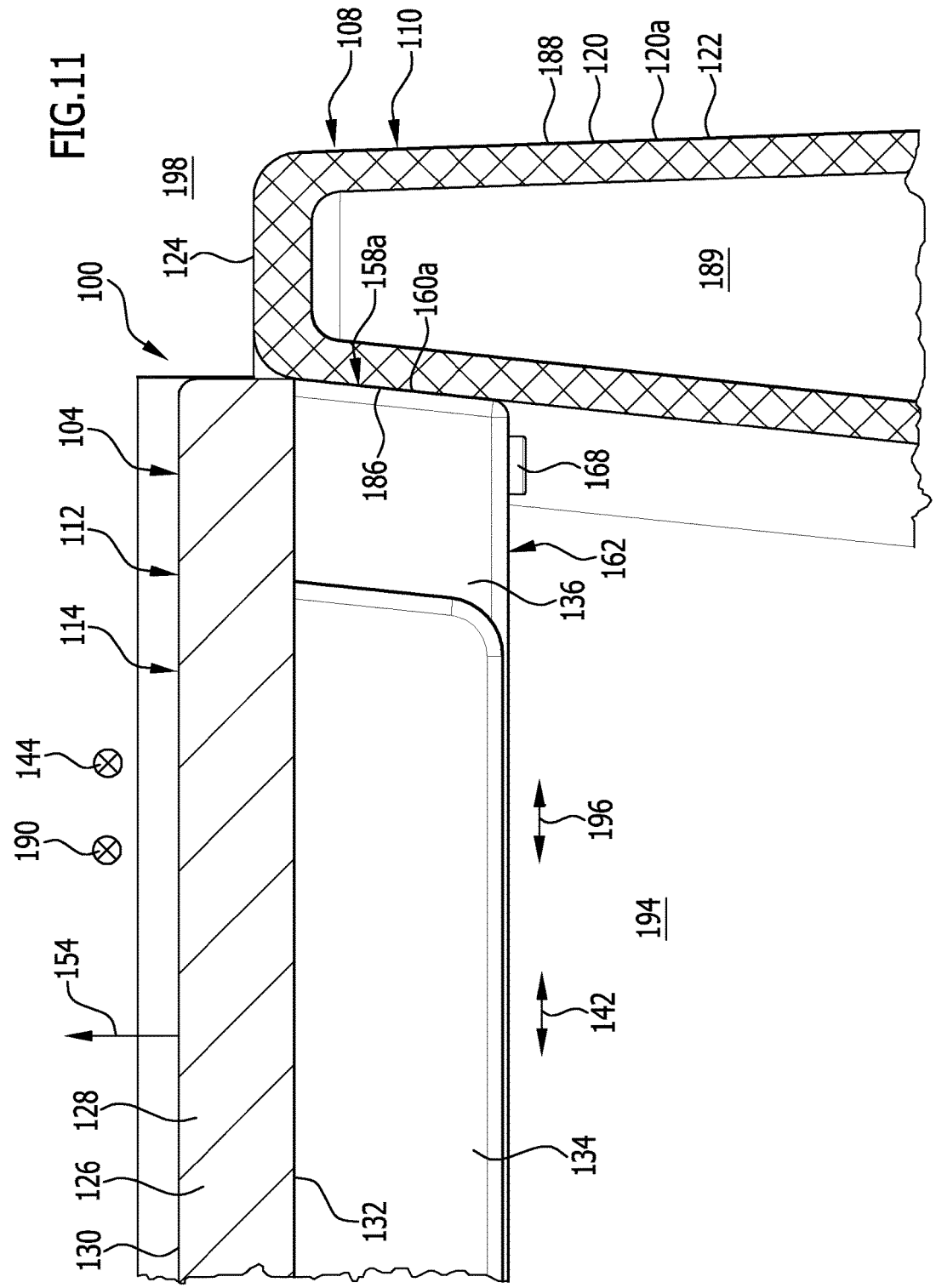
FIG. 11 shows an enlarged depiction of region II from FIG. 10.
Figure 12:
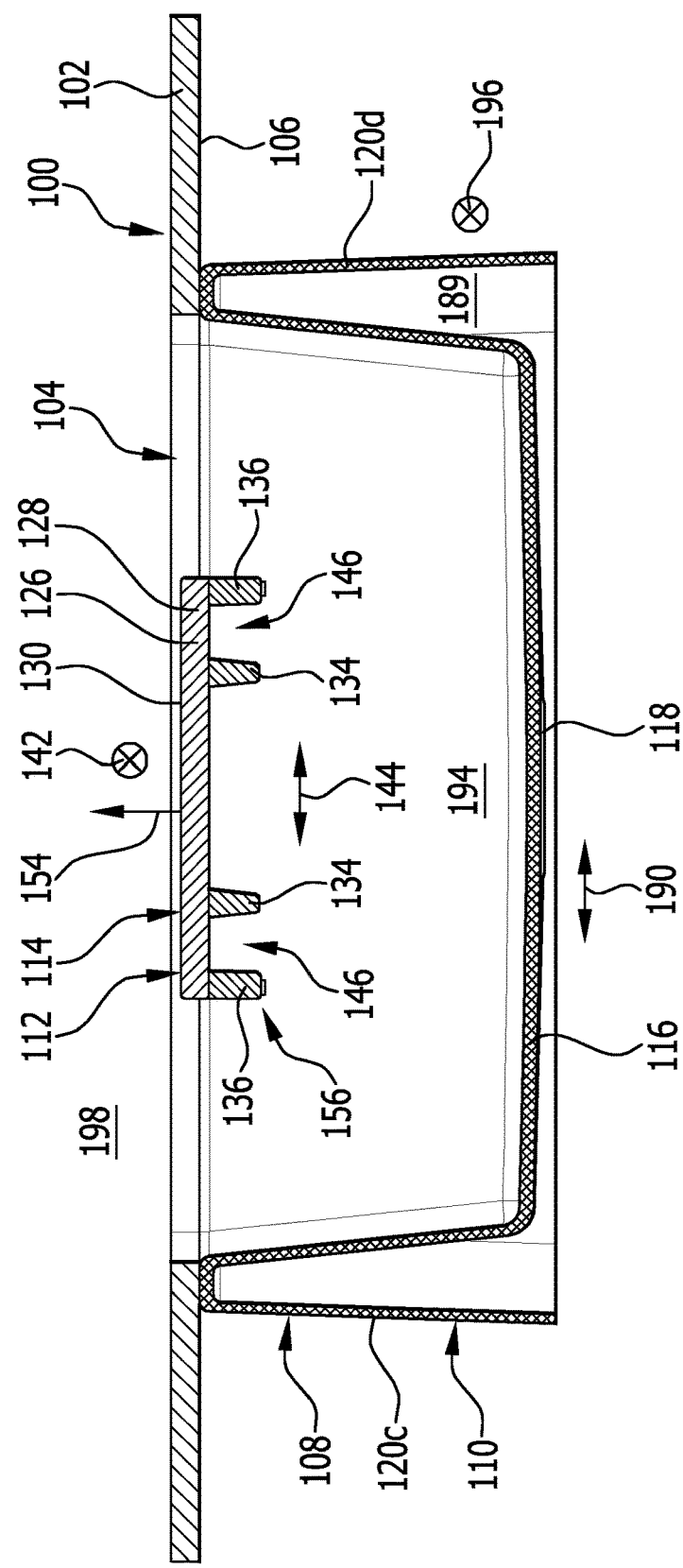
FIG. 12 shows a vertical cut through the combination comprising sink, work surface, and sink attachment from FIGS. 7 to 9, along the line 12-12 in FIG. 9.

As is seen in FIG. 10, the sink attachment 112 in this embodiment in its coupled position on the coupling sidewall 122 and on the opposing side wall 120b of the basin 110 is only partially received in the interior 194 of the basin 110.

Here, the coupling elements 134, 136 of the sink attachment 112 are located with the face-side coupling devices 158a, 158b arranged thereon in the coupled position in the interior 194 of the basin 110, while at least one part of the base body 126 protrudes upward over the upper rims of the side walls 120 into an exterior space 198 of the basin 110.

The sink attachment 112 is, in the transverse position coupled to the basin 110, tightly locked or fixed to the side walls 122, 120b, preferably by positive connection as well as by force-locking connection of the face-side seating faces 160a, 160b, between the coupling side wall 122 and the opposing side wall 120b.

Because the distance between the coupling side wall 122 and the opposing side wall 120b decreases in the region lying below the sink attachment 112 in the transverse position, the sink attachment 112 cannot be moved farther downward out of its coupled position toward the bottom region 116 of the basin 110.

Due to the force-locking connection between the face-side coupling devices 158a, 158b and the side walls 122, 120b, the sink attachment 112 can also no longer be moved in its transverse direction 144 relative to the basin 110 in the horizontal direction once it is coupled to the sidewalls 122, 120b.

A secure and stable locking of the sink attachment 112 in its coupled position on the basin 110 of the sink 108 is thereby ensured.

To remove the sink attachment 112 from its coupled position on the basin 110, the retention force must be overcome.

The sink attachment 112 can be removed from its coupled position on the basin 110 by using a force directed upward and by being assisted by a minimal elastic deformation of the face-side seating faces 160a, 160b and/or of the basin 110.

By means of the supporting elements 168, the sink attachment 112 can be placed on a drain board of the sink 108 (not depicted) or on another base, for example on a tabletop.

The invention claimed is:

1. A combination comprising a sink having at least one basin and a sink attachment for arranging on the sink, comprising a coupling device for coupling the sink attachment to a coupling sidewall of a basin of the sink in a working position,
   wherein the coupling device comprises an inner coupling element that is configured to be seated, in the working position, on an inner side of the coupling sidewall facing the interior of the basin and comprises an outer coupling element that is configured to be seated, in the working position, onto an outer side of the coupling sidewall facing away from the interior of the basin,
   wherein, in the working position, the sink attachment is coupled by the coupling device to the coupling sidewall only and
   wherein a part of the sink attachment which is arranged on that side of the inner coupling element that is facing away from the outer coupling element contains the center of gravity of the sink attachment.

2. The combination according to claim 1, wherein the inner coupling element is configured to be seated, in the working position, substantially in area contact with the inner side of the coupling sidewall and/or in that the outer coupling element is configured to be seated, in the working position, substantially in area contact with the outer side of the coupling sidewall.

3. The combination according to claim 1, wherein the inner coupling element and/or the outer coupling element is formed as a bar extending in a longitudinal direction of the sink attachment.

4. The combination according to claim 1, wherein the inner coupling element and the outer coupling element are arranged on a base body of the sink attachment, the base body having a supporting face.

5. The combination according to claim 4, wherein the inner coupling element has an inner seating face and the outer coupling element has an outer seating face, wherein the inner seating face and the outer seating face are tilted toward each other in such a way that the distance between the inner seating face and the outer seating face decreases with decreasing distance from the base body.

6. The combination according to claim 5, wherein the inner seating face and/or the outer seating face is tilted with respect to a normal direction of the supporting face of the base body.

7. The combination according to claim 4, wherein the sink attachment comprises a second inner coupling element that is configured to be seated, in a second working position in which the sink attachment is rotated about an angle of 180° with respect to the first working position, onto the inner side of the coupling sidewall, and comprises a second outer coupling element that is configured to be seated, in the second working position, onto the outer side of the coupling sidewall.

8. The combination according to claim 1, wherein the sink attachment is configured to be arranged on the basin of the sink in a transverse position, in which the longitudinal direction of the sink attachment is rotated about an angle of 90° with respect to the working position.

9. The combination according to claim 8, wherein the sink attachment comprises a first face-side coupling device for coupling the sink attachment to the coupling sidewall of the basin of the sink and comprises a second face-side coupling device for coupling the sink attachment to a second sidewall of the basin of the sink opposite to the coupling sidewall of the basin.

10. The combination according to claim 9, wherein the first face-side coupling device has at least one first face-side seating face which is configured to be seated, in the transverse position, onto the inner side of the coupling sidewall of the basin, and the second face-side coupling device has at least one second face-side seating face which is configured to be seated, in the transverse position, onto the inner side of the sidewall of the basin opposite to the coupling sidewall.

11. The combination according to claim 10, wherein the first face-side seating face and/or the second face-side seating face is tilted with respect a normal direction of a supporting face of a base body of the sink attachment.

12. The combination according to claim 1, wherein the sink attachment is configured as a cutting board, as a bowl, as a draining element, and/or as a grate.

13. The combination according to claim 1 wherein the sink attachment comprises a base body, on which the inner coupling element and the outer coupling element of the coupling device are arranged, wherein an underside of the base body connects an upper edge of the inner coupling element facing the base body to an upper edge of the outer coupling element facing the base body, and wherein the underside of the base body in the working position of the sink attachment is spaced apart from the coupling sidewall of the basin.

14. A sink attachment for arranging on a sink, comprising a coupling device for coupling the sink attachment to a coupling sidewall of a basin of the sink in a working position, wherein the coupling device comprises an inner coupling element that is configured to be seated, in the working position, on an inner side of the coupling sidewall facing the interior of the basin and comprises an outer coupling element that is configured to be seated, in the working position, onto an outer side of the coupling sidewall facing away from the interior of the basin, wherein the sink attachment comprises a second inner coupling element that is configured to be seated, in a second working position in which the sink attachment is rotated about an angle of 180° with respect to the first working position, onto the inner side of the coupling sidewall, and comprises a second outer coupling element that is configured to be seated, in the second working position, onto the outer side of the coupling sidewall, wherein the inner coupling element and the outer coupling element are arranged on a base body of the sink attachment, the base body having a supporting face, and wherein the sink attachment is formed substantially symmetrical with respect to a rotation of 180° about an axis of rotation running perpendicular to the supporting face of the sink attachment through the center of gravity thereof, and/or wherein the sink attachment is formed substantially mirror symmetrical with respect to a longitudinal medium plane of the sink attachment running parallel to a longitudinal direction of the sink attachment and perpendicular to the supporting surface of the sink attachment.

15. A combination comprising a sink having at least one basin and a sink attachment for arranging on a sink, comprising a coupling device for coupling the sink attachment to a coupling sidewall of a basin of the sink in a working position, wherein the coupling device comprises an inner coupling element that is configured to be seated, in the working position, on an inner side of the coupling sidewall facing the interior of the basin and comprises an outer coupling element that is configured to be seated, in the working position, onto an outer side of the coupling sidewall facing away from the interior of the basin, wherein the sink attachment is coupled by means of the coupling device to a coupling sidewall of the basin of the sink, wherein the sink attachment comprises a base body, on which the inner coupling element and the outer coupling element of the coupling device are arranged, wherein the inner coupling element and the outer coupling element, together with the base body, bound a receiving space for an upper rim region of the coupling sidewall, wherein an underside of the base body connects an upper edge of the inner coupling element facing the base body to an upper edge of the outer coupling element facing the base body, and wherein the underside of the base body in the working position of the sink attachment is spaced apart from the coupling sidewall of the basin.

* * * * *